(12) United States Patent
Hedler et al.

(10) Patent No.: US 9,151,850 B2
(45) Date of Patent: Oct. 6, 2015

(54) RADIATION DETECTOR AND IMAGING SYSTEM

(75) Inventors: Harry Hedler, Germering (DE);
Timothy Hughes, Erlangen (DE);
Martin Spahn, Erlangen (DE); Stefan Wirth, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/124,712

(22) PCT Filed: May 21, 2012

(86) PCT No.: PCT/EP2012/059389
§ 371 (c)(1),
(2), (4) Date: Dec. 7, 2013

(87) PCT Pub. No.: WO2012/168058
PCT Pub. Date: Dec. 13, 2012

(65) Prior Publication Data
US 2014/0124676 A1 May 8, 2014

(30) Foreign Application Priority Data
Jun. 7, 2011 (DE) .......................... 10 2011 077 056

(51) Int. Cl.
*G01T 1/20* (2006.01)
*G01T 1/28* (2006.01)

(52) U.S. Cl.
CPC ................ *G01T 1/2006* (2013.01); *G01T 1/20* (2013.01); *G01T 1/28* (2013.01)

(58) Field of Classification Search
CPC .............................. G01T 1/20; G01T 1/2006
USPC ....................................................... 250/366
See application file for complete search history.

(56) References Cited

U.S. PATENT DOCUMENTS

| 4,438,334 | A | * | 3/1984 | Jatteau et al. | 250/363.02 |
| 5,099,128 | A | * | 3/1992 | Stettner | 250/370.11 |
| 5,319,189 | A | * | 6/1994 | Beauvais et al. | 250/214 VT |
| 5,338,927 | A | * | 8/1994 | de Groot et al. | 250/214 VT |
| 7,829,863 | B2 | * | 11/2010 | Kimura et al. | 250/396 R |

(Continued)

FOREIGN PATENT DOCUMENTS

WO 2010094272 A2 8/2010

OTHER PUBLICATIONS

German Office Action dated May 23, 2013 in corresponding German Patent Application No. DE 10 2011 077 056.9 with English translation.

(Continued)

*Primary Examiner* — Marcus Taningco
(74) *Attorney, Agent, or Firm* — Lempia Summerfield Katz LLC

(57) ABSTRACT

The invention relates to a radiation detector (100; 101; 102; 103; 104; 105; 106), having a scintillator (120) for generating electromagnetic radiation (202) in response to the action of incident radiation (200). The scintillator (120) has two opposing end faces (121; 122) and a lateral wall (123) between the end faces (121; 122). The radiation detector has, in addition, a conversion system (160) located on the lateral wall (123) of the scintillator (120), said system comprising a plurality of channels (165). Each channel (165) has a photocathode section (130; 131; 132) for generating electrons (204) in response to the action of electromagnetic radiation (202) that is generated by the scintillator (120), said electrons being multipliable by impact processes in the channels (165). A detection system (170) for detecting electrons (204) that have been multiplied in the channels (165) of the conversion system (160) is also provided. The invention also relates to an imaging system (110) comprising a radiation detector of this type (100; 101; 102; 103; 104; 105; 106).

13 Claims, 11 Drawing Sheets

(56) References Cited

U.S. PATENT DOCUMENTS

| | | |
|---|---|---|
| 2005/0072898 A1 | 4/2005 | Yumi et al. |
| 2009/0256063 A1 | 10/2009 | Sullivan et al. |
| 2010/0001193 A1 | 1/2010 | Feller et al. |
| 2010/0270462 A1 | 10/2010 | Nelson et al. |

OTHER PUBLICATIONS

Heejong Kim et al., "Continuous Scintillator Slab with Microchannel Plate PMT for PET", 2009 IEEE Nuclear Science Symposium Conference Record, Oct. 24, 2009, pp. 2553-2556.

International Search Report and Written Opinion in PCT/EP2012/059389, dated Dec. 14, 2012 with English translation.

Martin Spahn, "Flat Detectors and their Clinical Applications", Eur Radiol., Apr. 2, 2005, pp. 1934-1947, vol. 15.

Wu Gao et al., "Design of a Monolithic Multichannel Front-End Readout ASIC for PET Imaging Based on Scintillation Crystals Read Out by Photodectors at Both Ends", 2nd International Conference on Advancements in Nuclear Instrumentation Measurement Methods and Their Applications (ANIMMA), Jun. 6, 2011, pp. 1-8.

\* cited by examiner

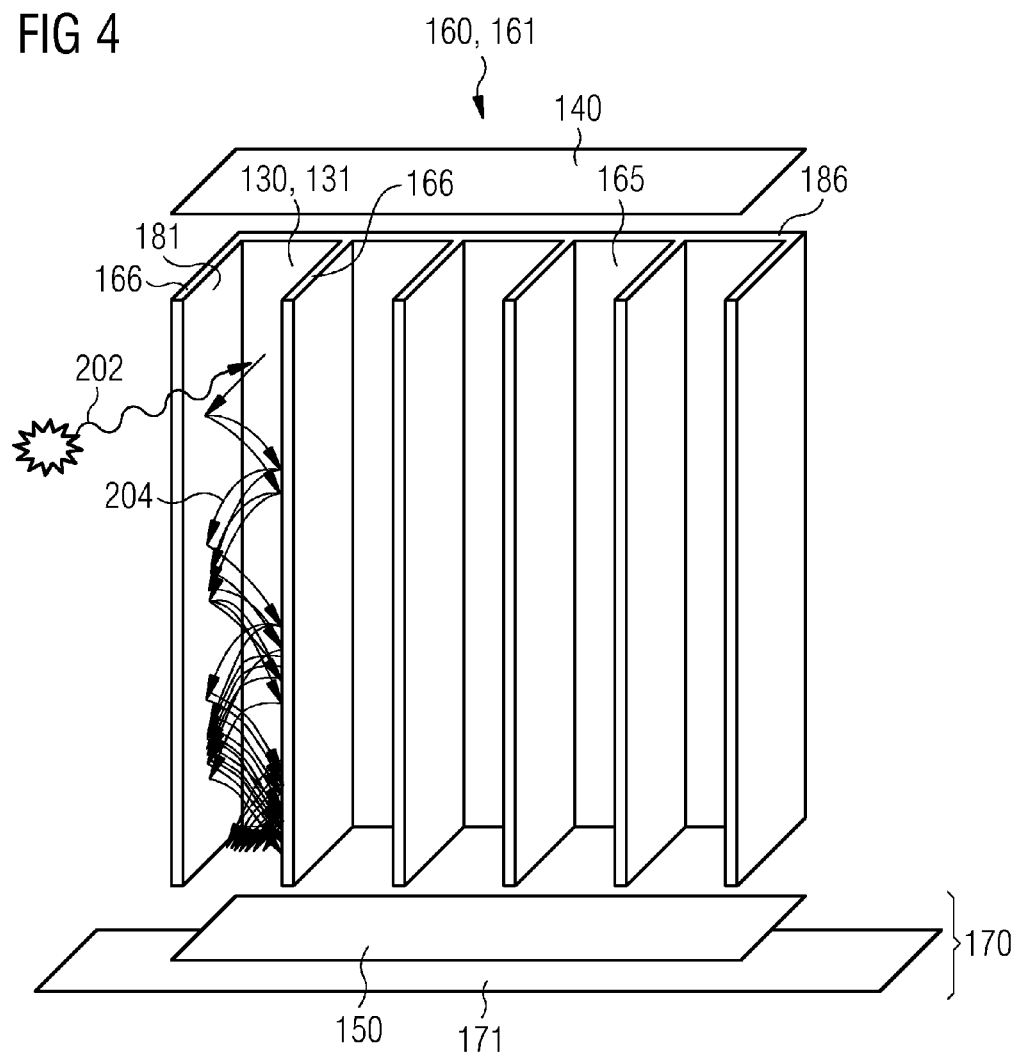

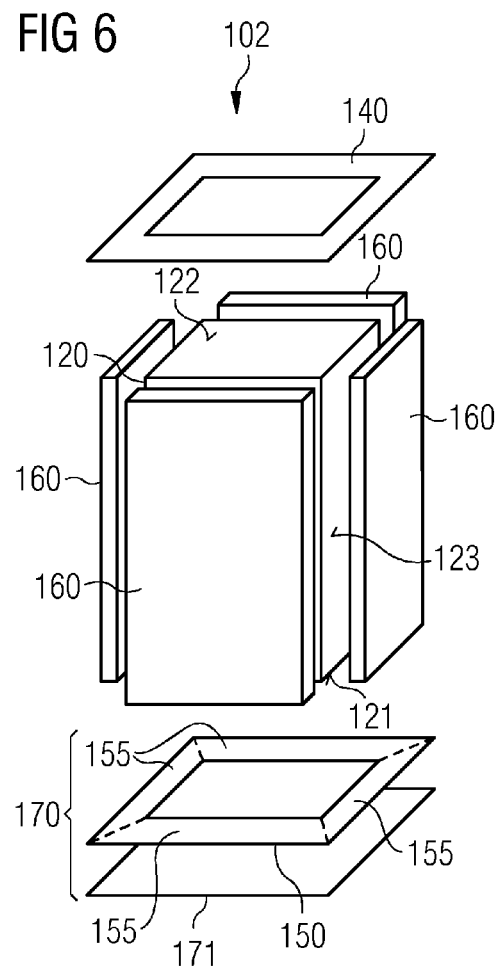
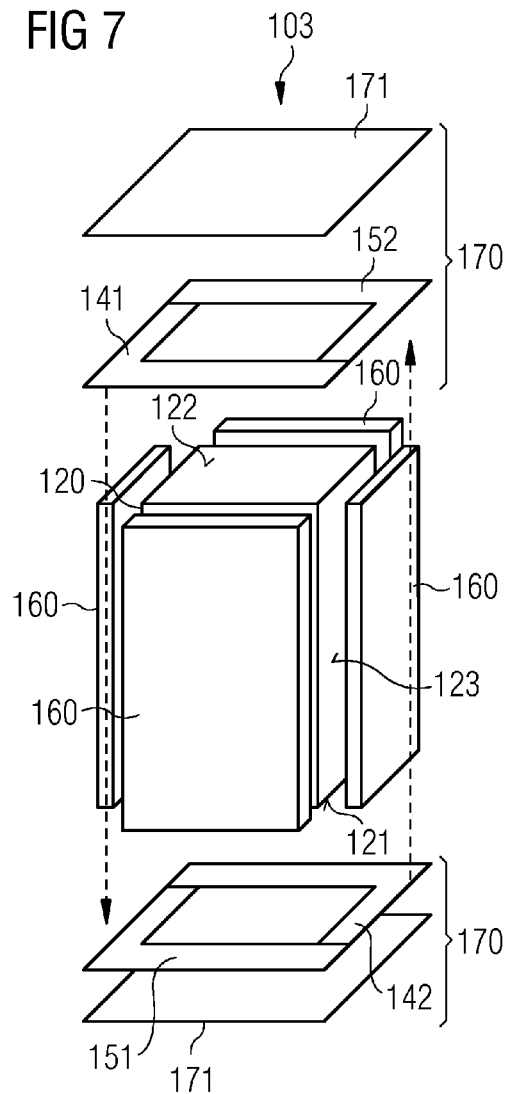

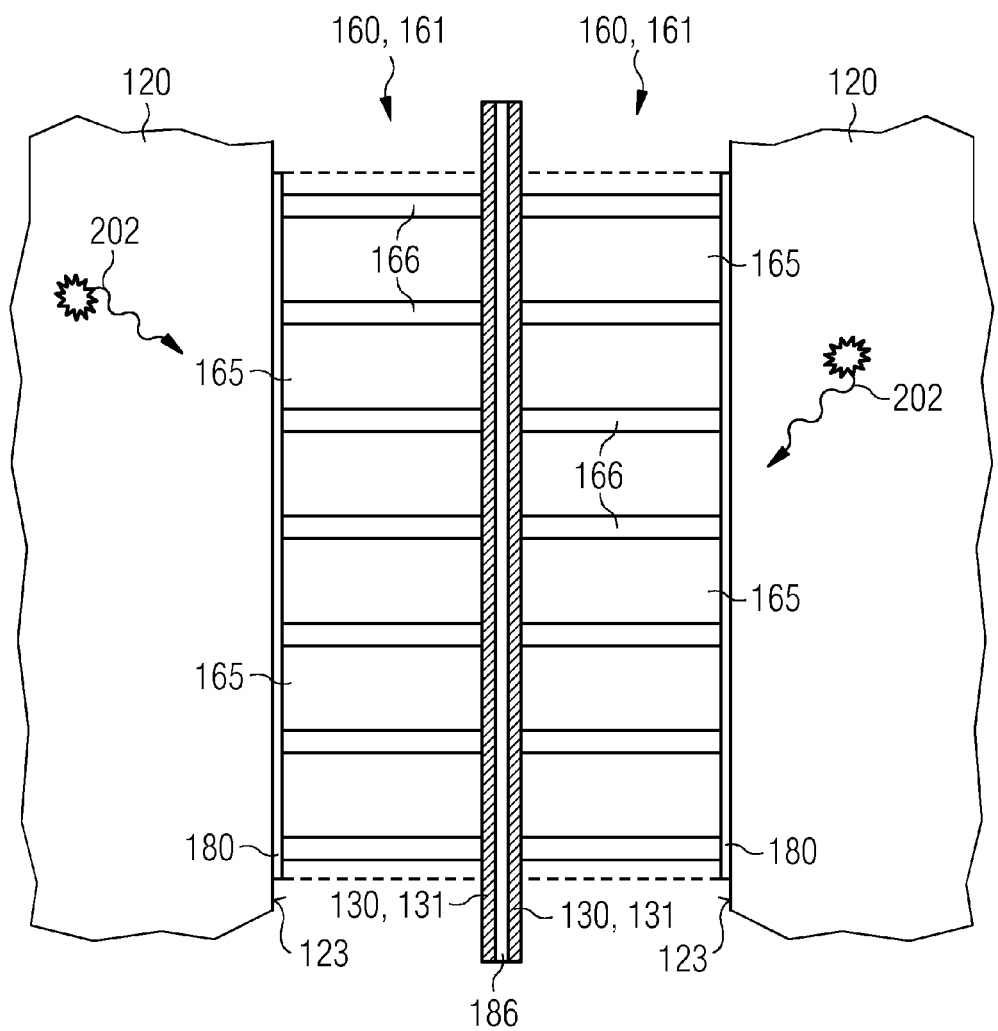

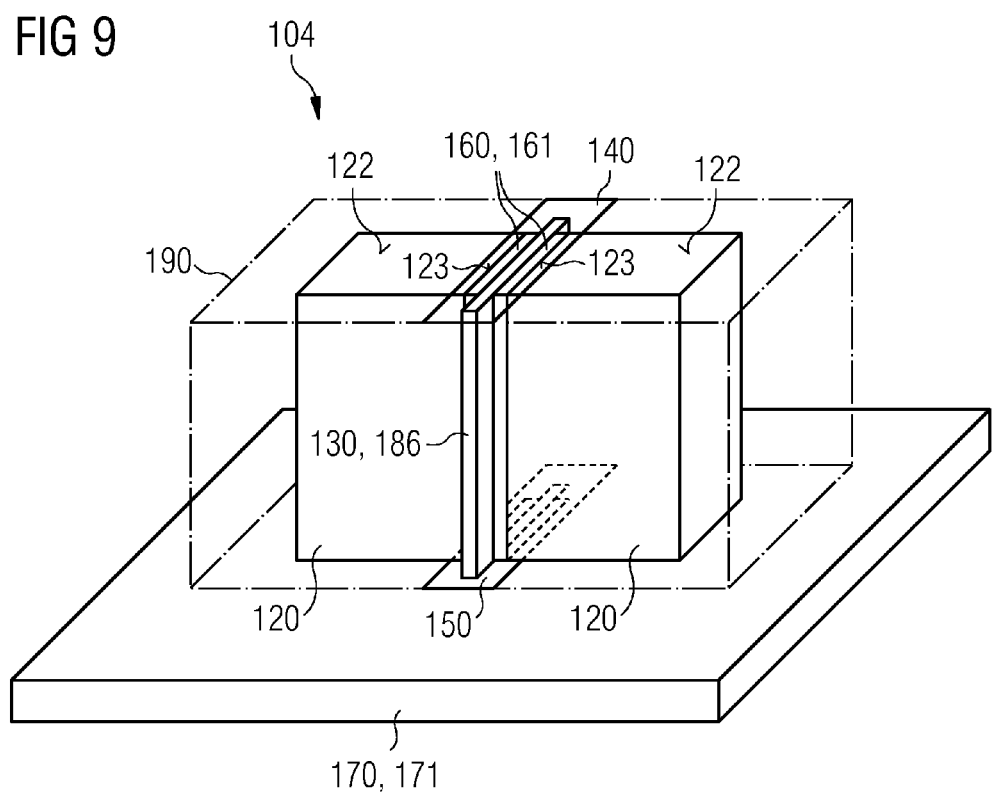

RADIATION DETECTOR AND IMAGING SYSTEM

RELATED APPLICATIONS

This application is the National Stage of International Application No. PCT/EP2012/059389, filed May 21, 2012, which claims the benefit of German Patent Application No. DE 102011077056.9, filed Jun. 7, 2011. The entire contents of both documents are hereby incorporated herein by reference.

TECHNICAL FIELD

The present teachings relate to radiation detectors that may be used to detect electromagnetic radiation (e.g., X-ray radiation or gamma radiation), and to imaging systems that includes such a radiation detector.

BACKGROUND

Imaging systems are increasingly important in medical technology. For example, imaging systems may be used to generate two- or three-dimensional image data of organs and structures of the human body. Such image data may be used, for example, to diagnose causes of illness, perform operations, and prepare therapeutic measures. The image data may be generated on the basis of measurement signals obtained with the aid of a radiation detector.

For example, in X-ray and computed tomography (CT) systems, the body or a body section of a patient to be examined is radiographed by X-ray radiation generated by a radiation source. The non-absorbed, transmitted portion of the radiation is detected by a detector.

By way of further example, in positron emission tomography (PET) systems and single photon emission computer tomography (SPECT) systems, image generation is achieved using radionuclides. The patient to be examined is injected with a radiopharmaceutical that generates gamma quanta either directly (e.g., in the case of SPECT) or indirectly (e.g., in the case of PET) through emission of positrons. The gamma radiation is detected by a corresponding radiation detector.

Detectors used for the energy-resolved detection or "counting" of radiation quanta may operate according to different measurement principles. For example, radiation may be detected either directly (e.g., by direct conversion of the radiation energy into electrical energy) or indirectly. In the case of indirect detection, a scintillator may be used. A scintillator is excited in response to the action of radiation to be detected and reemits the excitation energy by emitting lower-energy electromagnetic radiation. Only the radiation emitted by the scintillator is converted into electrical measurement signals. Detectors of planar construction (e.g., "flat detectors") are used in the medical field and operate in accordance with these measurement principles (as described, for example, in: M. Spahn, "Flat detectors and their clinical applications," *Eur. Radiol.*, 2005, 15, 1934-1947).

The conversion of the radiation emerging from a scintillator into an electrical signal may be effected in various ways. For example, a photomultiplier provided with a photocathode in the form of an evacuated electron tube may be used. Alternatively, a silicon photomultiplier (SiPM) that involves a matrix arrangement of avalanche photodiodes (APD) embodied on a shared substrate may be used. The electrons are generated in the avalanche photodiodes as a result of incident photons, and are multiplied in an avalanche-like manner.

A disadvantage of silicon photomultipliers is that only part of the total area available for irradiation may be utilized as a sensitive or "active" area since there are insensitive regions (e.g., where resistors and signal lines or wiring structures are arranged) between the active or radiation-sensitive regions. Thus, a silicon photomultiplier has a relatively small ratio of active area to (irradiated) total area. This ratio is designated as a "filling factor". Further disadvantages include the occurrence of noise during an operation and a relatively high dark rate or dark count (e.g., signal generation taking place even without irradiation).

In a detector having a scintillator and a silicon photomultiplier, the silicon photomultiplier may be opposite an end face or rear side of the scintillator, such that an opposite end face or front side of the scintillator faces the radiation to be detected. As a result, the silicon photomultiplier may detect only that portion of the radiation converted in the scintillator that emerges at the rear side thereof. However, the scintillation radiation emanating from the respective excitation or interaction location in the scintillator is emitted in other directions besides the direction of the rear side. Furthermore, the radiation is subject to loss processes (e.g., reflection, absorption, and scattering). The losses are relatively high for scintillators having a high aspect ratio (e.g., of height to width) as, for example, in a PET system. For an aspect ratio of greater than 7:1, the radiation emerging from a scintillator may constitute merely 40-60% of the total radiation generated. Although a higher intensity of the incident radiation may be provided to compensate for the loss, a patient would be exposed to an increased radiation dose as a result.

A further disadvantage of conventional detector design is that the interaction location of incident radiation in a scintillator is either undetectable or may be detected only with great difficulty based on the radiation emerging at the rear side of the scintillator. Moreover, information about the height or depth of an interaction in the scintillator may not be obtainable. Consequently, the resolution of imaging systems provided with such detectors is restricted.

Microchannel plates (MCP) having a multiplicity of channels have been used for image intensification and electron multiplication. During operation, an electrical voltage present along the channels is generated. As a result of the voltage, entering electrons may be accelerated within the channels and multiplied by impacts with the channel walls. The use of a microchannel plate in connection with an image intensifier is described in U.S. Patent Application Publication No. 2009/0256063 A1.

A PET detector module has been described by Wu Gao et al. ["Design of a Monolithic Multichannel Front-End Readout ASIC for PET Imaging Based on Scintillation Crystals Read Out by Photodetectors at Both Ends," Advancements in Nuclear Instrumentation Measurement Methods and their Applications (ANIMMA), 2011 2nd International Conference on, IEEE, Jun. 6, 2011 (2011-06-06), pages 1-8, XP032153585, DOI: 10.1109/ANIMMA.2011.6172963, ISBN: 978-1-4577-0925-8]. The detector module includes scintillator crystals arranged alongside one another. A microchannel plate photomultiplier for detecting scintillation radiation is arranged at two opposite sides of the scintillator arrangement.

A further PET detector module is described by Heejong Kim et al. ["Continuous Scintillator Slab with Microchannel Plate PMT for PET," 2009 IEEE Nuclear Science Symposium and Medical Imaging Conference (NSS/MIC 2009), Orlando, Fl., USA, IEEE, Piscataway, N.J., USA, Oct. 24, 2009 (2009-10-24), pages 2553-2556, XP031826651, DOI: 10.1109/NSSMIC.2009.5402028, ISBN: 978-1-4244-3961-

4]. The detector module includes one or two layers of a plate-shaped scintillator. Microchannel plate photomultipliers for detecting scintillation radiation are arranged at the sides of the scintillators.

A SPECT camera including a scintillator, a photocathode, a microchannel plate, and a detection device having a photoanode is described in International Publication No. WO 2010/094272 A1.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, a solution for improved radiation detection in the medical field is provided.

A radiation detector in accordance with the present teachings includes a scintillator configured for generating electromagnetic radiation in response to the action of incident radiation. The scintillator includes a first end face and an opposing second end face, and a lateral wall between the first end face and the second end face. The radiation detector further includes a conversion device arranged on the lateral wall of the scintillator. The conversion device includes a plurality of channels. Each channel of the plurality of channels includes a photocathode section configured for generating electrons in response to the action of the electromagnetic radiation generated by the scintillator. The electrons are multipliable as a result of impact processes in the plurality of channels. The radiation detector further includes a detection device configured for detecting electrons multiplied in the plurality of channels of the conversion device.

During operation of the radiation detector, the first end face or the second end face of the scintillator may face the radiation to be detected (e.g., X-ray radiation or gamma radiation). The electromagnetic radiation (e.g., visible or ultraviolet light) generated by the incident radiation in the scintillator that passes to the lateral wall of the scintillator may be converted into electrons directly by the conversion device. In some embodiments, the conversion device provides a combination of a microchannel plate and a photocathode. The radiation emitted by the scintillator is first taken up or absorbed by the photocathode sections of the channels, thereby liberating electrons. The electrons may be further multiplied in the plurality of channels (e.g., "electron path"). The conversion device may thus convert the scintillation radiation rapidly and directly into a multiplicity of electrons that may be detected by the detection device. A large part of the radiation converted in the scintillator may be used to generate electrons due to the arrangement of the conversion device on the lateral wall of the scintillator. In some embodiments, the scintillator has a high aspect ratio, and the lateral wall has a relatively large surface area as compared to the first end face and the second end face. As a result, the radiation detector may be distinguished by a high temporal resolution and high efficiency.

The radiation detector may have less noise (in some embodiments, substantially less noise) and a lower dark rate as compared to a conventional detector having a silicon photomultiplier. Without scintillator radiation, the photocathode sections do not generate electrons. As a result, substantially no electron multiplication takes place in the channels of the conversion device, thereby allowing for reduced noise and dark rate. In some embodiments, the channels of the conversion device may be arranged at small distances from each other or alongside one another on the lateral wall of the scintillator. As a result, a high filling factor (e.g., ratio of active area to irradiated total area) may be present. In some embodiments, the filling factor is substantially higher than that of a conventional silicon photomultiplier, thereby providing a high efficiency to the radiation detector.

In some embodiments, the detection device includes an electrode configured for trapping electrons arranged at one end of the channels. A counterelectrode is arranged at an opposite end of the channels in order to move electrons to the electrode of the detection device. As a result, the electrons generated by the photocathode sections may be reliably moved or accelerated in the direction of the electrode. Moreover, the electrons may collide with the channel walls during movement, thereby liberating additional electrons.

In some embodiments, the lateral wall of the scintillator is planar. In some embodiments, the conversion device includes a plate-shaped structure on the lateral wall of the scintillator that provides a space-saving and simple configuration to the conversion device. The conversion device or a portion thereof may arise from a structured substrate. The structured substrate may be arranged on or connected to the planar lateral wall of the scintillator.

In an alternative space-saving and simple configuration, the lateral wall of the scintillator includes depressions. The channels of the conversion device are formed through the depressions. In some embodiments, the channels formed by the depressions may be closed on the lateral wall of the scintillator (e.g., with the aid of a substrate or carrier element arranged on the lateral wall).

In some cost-effective and simple embodiments, the photocathode sections of the channels of the conversion device are embodied in the form of a continuous photocathode. The photocathode may be arranged on a carrier element.

In some embodiments, the lateral wall of the scintillator is provided with a layer that is transmissive to electromagnetic radiation generated by the scintillator. The transmissive layer may serve as an entrance window for the channels of the conversion device, and may minimize or suppress reflection of the radiation converted by the scintillator at the lateral wall, thereby providing high efficiency to the radiation detector.

In some embodiments, the channels of the conversion device have a wall coating configured to liberate a plurality of electrons in response to impact from an individual electron. In some embodiments, a material having high secondary electron emission is used for the wall coating.

In some embodiments, the channels of the conversion device run parallel to a longitudinal axis of the scintillator that extends between the first end face and the second end face. The detection device may be provided in the region of an end face of the scintillator, thereby facilitating compact detector construction.

In some embodiments, the scintillator is parallelepipedal and includes four lateral walls between the first end face and the second end face. A conversion device that includes a plurality of channels is arranged on each of the four lateral walls.

In some embodiments, a substantial part of the electromagnetic radiation generated in the scintillator may be converted into electrons, thereby providing a high efficiency of the radiation detector.

In some embodiments, the detection device is configured for separately detecting electrons generated and multiplied in channels of different conversion devices and electrons generated in channels of different subsections of a single conversion device. In such embodiments, the lateral location of an interaction between a radiation quantum and the scintillator may be accurately detected. The detection device may have different electrode regions or segments for separately trapping electrons.

In some embodiments, the radiation detector is configured (e.g., using electrode arrangements) to move electrons in the channels of different conversion devices in a different direction than electrons in the channels of different subsections of a single conversion device. As a result of separately detecting electrons accelerated in different directions, the height or depth of an interaction in the scintillator may be accurately detected.

In some embodiments, the radiation detector is configured to convert a portion of the electromagnetic radiation generated in the scintillator and emerging at an end face thereof into electrons, and further configured to detect the electrons. In some embodiments, the radiation detector may include an additional photocathode section configured for generating electrons in response to the action of electromagnetic radiation generated by the scintillator in the region of an end face thereof. The emitted electrons emitted may be multiplied with the aid of a microchannel plate, and subsequently detected by the detection device. Such a configuration may provide high efficiency to the radiation detector.

In some embodiments, the radiation detector includes a first scintillator and a second scintillator arranged side-by-side. Conversion devices may be arranged in an interspace between the first scintillator and the second scintillator. Each of the conversion devices may include a plurality of channels. In addition, each conversion device may be provided on opposite lateral walls of the first scintillator and the second scintillator and assigned to the first scintillator and the second scintillator. In some embodiments, the radiation detector further includes a detection device assigned to the conversion devices that is configured for detecting electrons. The above-described modular construction of the radiation detector may also be realized with more than two scintillators arranged side-by-side. This space-saving configuration for the conversion devices minimizes the interspace between the scintillators. As a result, a high filling factor and high efficiency may be provided.

An imaging system in accordance with the present teachings includes a radiation detector of a type described above. In some embodiments, the imaging system is an X-ray system, a computed tomography system, a positron emission tomography system, or single photon emission computed tomography system. Imaging systems in accordance with the present teachings may include an above-described detector as an individual detector element or as a "pixel" of an associated detector. Imaging systems in accordance with the present teachings may include a multiplicity of such detector elements or "pixels" arranged side-by-side in a planar configuration, a circular configuration, a partly circular configuration, or a combination thereof.

BRIEF DESCRIPTION OF THE DRAWINGS

FIG. 4 shows an exploded perspective view of the conversion device shown in FIG. 3.

FIG. 6 shows an exploded perspective view of a first exemplary detector element. The detector element includes a plurality of conversion devices and is configured to detect electrons generated in the different conversion devices on a segment-by-segment basis.

FIG. 7 shows an exploded perspective view of a second exemplary detector element. The detector element includes a plurality of conversion devices and is configured to move electrons generated in different conversion devices in different directions.

FIG. 8 shows a plan view in partial cross-section of a first scintillator and a second scintillator arranged side-by-side, and conversion devices assigned to the first scintillator and the second scintillator arranged in an interspace between the first scintillator and the second scintillator.

FIG. 9 shows a perspective view of a third exemplary detector element configured as shown in FIG. 8.

DETAILED DESCRIPTION

A detector or detector element that may be used to detect electromagnetic radiation (e.g., high-energy radiation such as X-ray radiation or gamma radiation) are described in reference to the figures. In order to produce the embodiments described, Method processes from the field of semiconductor and detector technology and conventional materials may be used to produce embodiments in accordance with the present teachings.

Detectors in accordance with the present teachings may be used with imaging systems in the field of medical technology. In such imaging systems, two- or three-dimensional image data of organs and structures of the human body are generated based on measurement signals obtained with a corresponding radiation detector.

Figure 1:
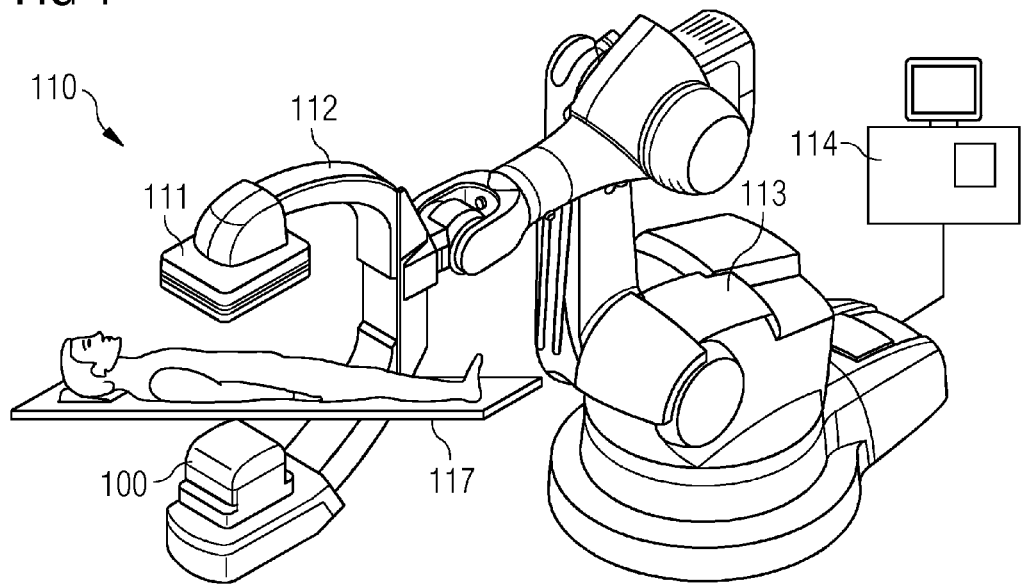
FIG. 1 shows a perspective view of an exemplary X-ray system.

FIG. 1 shows an X-ray system 110 that may be used for diagnostic and interventional imaging. The X-ray system 110 includes a radiation source 111 configured for emitting X-ray radiation (e.g., an "X-ray emitter") and an associated detector 100 of planar construction (e.g., "flat detector") configured for detecting the radiation. The radiation source 111 and the detector 100 are arranged opposite one another at the ends of a C-shaped holding device 112 in a configuration that is referred to as "C-arc" or "C-arm."

A patient to be examined may be situated on a patient-supporting couch 117 and arranged between the radiation source 111 and the detector 100. During operation of the X-ray system 110, the body or a body section of the patient is radiographed with the X-ray radiation generated by the radiation source 111. The non-absorbed, transmitted portion of radiation is detected by the detector 100.

The holding device 112 is fixed to a robot 113 provided with a plurality of axes, articulations, or axes and articulations. The radiation source 111 and the detector 100 may be brought to a desired position in relation to the patient by using the robot. To control the X-ray system 110 and to process, evaluate, or process and evaluate measurement signals of the detector 100 (e.g., for generating desired image data), the X-ray system 110 may further include a control, an evaluation device 114, or a control and an evaluation device 114. The evaluation device 114 is connected to a corresponding display device or a display, as shown in FIG. 1.

The detector described below may be used with the X-ray system 110 shown in FIG. 1 and in association with other imaging systems (not shown). By way of example, systems that include a gantry (e.g., a computed tomography (CT) system) are appropriate. The system may include an annular or circular-cylindrical detector and a rotatable X-ray source. Additional exemplary applications with a gantry include positron emission tomography (PET) systems and single photon emission computed tomography (SPECT) systems. In PET systems and SPECT systems, the patient to be examined is injected with a radiopharmaceutical that generates gamma quanta either directly (e.g., SPECT) or indirectly (e.g., PET) through emission of positrons. The quanta may be detected by an annular or circular-cylindrical detector.

Figure 2:
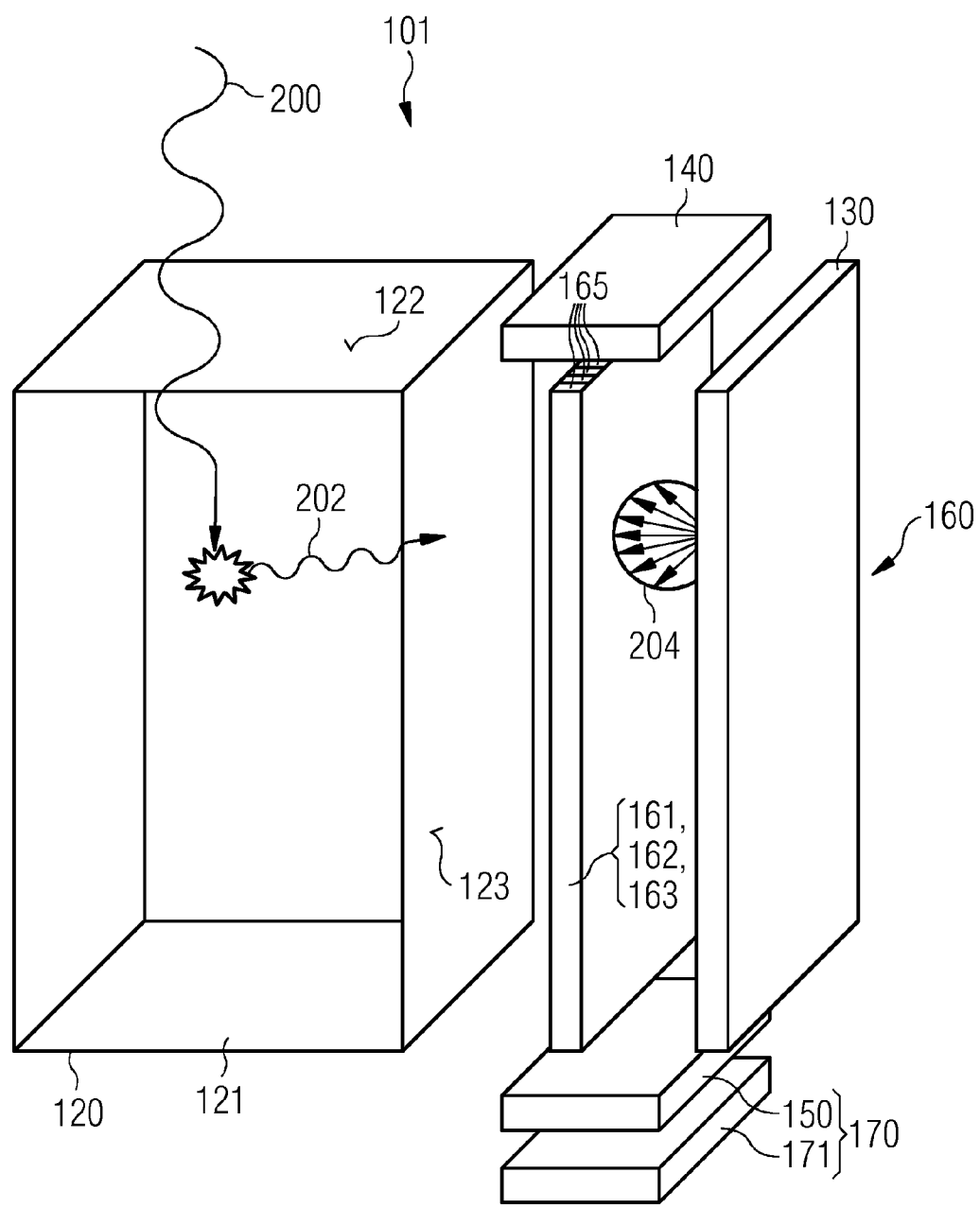
FIG. 2 shows an exploded perspective view of representative component parts of an exemplary detector element. A scintillator and a conversion device for converting scintillation radiation into electrons are depicted. The conversion device is arranged on a lateral wall of the scintillator.

FIG. 2 shows an exploded perspective view of a representative detector element 101 that may be used for detecting incident high-energy radiation. Additional embodiments of detector elements described below in reference to other figures may be constructed based on the detector principles described in reference to FIG. 2. In addition, a radiation detector of an imaging system (e.g., the detector 100 of the system 110 shown in FIG. 1) may include a multiplicity of detector elements constructed as described in reference to FIG. 2. The detector elements may be arranged alongside one another in the form of "pixels" in a matrix-like manner. In some embodiments, the configuration may be planar, annular, partly annular, or a combination thereof. The desired image data may be generated based on measurement signals generated by the individual pixels or detector elements of a detector.

As shown in FIG. 2, the detector element 101 has a scintillator 120 configured to convert the high-energy radiation to be detected into a low-energy or lower-energy radiation. The scintillator 120 is parallelepipedal and includes a first end face 121, an opposing second end face 122, and four lateral walls 123 between the first end face 121 and the second end face 122. The lateral walls 123 adjoin each another at right angles. The second end face 122 directed upwards in FIG. 2 is referred to hereinafter as the "front side" of the scintillator 120. The first end face 121 directed downward in FIG. 2 is referred to as the "rear side" of the scintillator 120. The front side 122 and the rear side 121 are connected to one another via the lateral walls 123 along a periphery or edge.

As further shown in FIG. 2, the scintillator 120 has a high aspect ratio. A high aspect ratio refers to a ratio of height (e.g., the distance between the first end face 121 and second end face 122) to width (e.g., lateral dimension or distance between two mutually opposite lateral walls 123) that is greater than one or, in some embodiments, substantially greater than one. A high absorption of the high-energy radiation may be detected in the scintillator 120. The high-energy radiation is indicated by a radiation quantum 200 as shown in FIG. 2. In the drawings, the components that are shown as well as their dimensions may be illustrated in a manner that is not true-to-scale. By way of example, the scintillator 120 may have a larger height or a larger aspect ratio.

During operation of the detector element 101, the front side 122 of the scintillator 120 faces the radiation to be detected, such that the radiation may be incident to or coupled into the scintillator 120 via the front side 122. The radiation quantum 200 (e.g., an X-ray quantum or a gamma quantum) of the incident radiation may cause a local excitation upon passing through the scintillator 120. The excitation energy deposited or absorbed during this process may be reemitted by the scintillator 120 in the form of lower-energy radiation quanta or photons 202. The number of emitted photons 202 may be proportional to the original energy of the radiation quantum 200 that interacts with the scintillator material. In some embodiments, the scintillation radiation generated by the scintillator 120 may be visible light or ultraviolet light.

In addition to radiation emission in the direction of the first end face 121 and the second end face 122 of the scintillator 120, a large portion of the scintillation radiation or photons 202 generated in the scintillator 120 may be emitted in the direction of the lateral walls 123. Emission in the direction of the lateral walls 123 may occur, for example, if the scintillator 120 has a high aspect ratio. As a result of the high aspect ratio, the lateral walls 123 have a relatively large surface area as compared to the first end face 121 and the second end face 122 of the scintillator 120. As shown in FIG. 1, the detector element 101 is configured to use that portion of the scintillation radiation that passes to the lateral wall 123 for detecting radiation. The configuration shown in FIG. 1 may be provided on each of the four lateral walls 123, thereby providing high detection efficiency.

The detector element 101 includes a conversion device 160 arranged on a lateral wall 123 for detecting scintillation radiation. With the aid of the conversion device 160, the photons 202 emitted in the direction of the lateral wall 123 and emerging from the scintillator 120 at the lateral wall 123 may be converted into electrons 204. The electrons 204 may be further multiplied. In some embodiments, the conversion device 160 has substantially the same external dimensions as the lateral wall 123. As a result, the lateral wall 123 may be substantially completely "covered" by the conversion device 160.

The conversion device 160 includes a channel structure 161, 162, 163 having a plurality of microscopically fine channels 165 that may be referred to as "microchannels," "cells," or "microcells." Various configurations may be used for the conversion device 160 and the channel structure 161, 162, 163 of conversion device 160. By way of example, as further described below in reference to FIGS. 3 and 5, a conversion device 160 may be provided in the form of a plate-shaped structure, wherein the associated channel structure 161, 162 may include a structured substrate arranged on the lateral wall 123. In an alternative configuration, as described below in reference to FIG. 14, the conversion device 160 may include a channel structure 163 wherein the channels 165 are formed by indentations or depressions embodied in the lateral wall 123 of the scintillator 120.

The channels 165 may be arranged side-by-side in a plane in the region of the lateral wall 123 of the scintillator 120. The channels 165 may extend along the lateral wall 123 or along a plane predefined by the lateral wall 123. In some embodiments, as shown in FIG. 2, the channels 165 may run parallel to a longitudinal axis of the scintillator 120 that extends between the first end face 121 and the second end face 122.

Each channel 165 of the channel structure 161, 162, 163 may be provided with an internal photocathode section. As shown in FIG. 2, the internal photocathode section may be a continuous photocathode 130. The photons 202 emerging at the lateral wall 123 may be converted into electrons 204 (e.g., photoelectrons) using the photoelectric effect in the channels 165. An electron 204 may be liberated for each photon 202 that impinges on the photocathode 130 or photocathode section and is absorbed. The photocathode 130 may be situated in the region of or within the channels 165. A configuration that includes separate internal photocathode sections (e.g., arranged separately from one another on or in each channel 165) may be used instead of the continuous photocathode 130 shown in FIG. 2.

The electrons 204 emitted by the photocathode 130 or the photocathode sections may be multiplied by impact processes in the channels 165 of the respective channel structure 161, 162, 163, and subsequently detected. The detector element 101 may include an electrode arrangement that includes an electrode 150 and a corresponding counterelectrode 140 arranged at opposite ends of the conversion device 160 or the channel structure 161, 162, 163 of the conversion device 160. An electrical voltage (e.g., an acceleration voltage) is applied to the electrode 150 and the counterelectrode 140. As a result, an electric field present along the channels 165 is generated. The electric field may be used to reliably move the electrons 204 in the direction of the electrode 150. In some embodiments, the counterelectrode 140 includes a cathode, and the electrode 150 includes an anode. The detector element 101 may include a suitable connection structure (not shown) for applying the voltage (e.g., in the high-voltage range).

The electrons 204 (e.g., primary electrons) emitted by the photocathode 130 or the photocathode sections in the channels 165 may impact the walls (e g, inner walls) of the associated channels 165. The electrons 204 may also multiply during movement or acceleration in the direction of the electrode 150 brought about by the electric field, and may eject or liberate further electrons 204 (secondary electrons) upon each impact. The liberated electrons 204 may likewise be accelerated within the channels 165 and liberate additional electrons 204 as a result of impacts with the channel walls. This process continues over the length of the channels 165 and provides an avalanche- or cascade-like increase in the electrons 204. In some embodiments, to facilitate the process, the channels 165 have small lateral dimensions (e.g., in the micrometers range).

The electrons 204 multiplied in the channels 165 may pass to the electrode 150 that may be simultaneously used as a trapping or readout electrode (e.g., a "readout pad") for trapping or collecting the multiplied electrons 204. As shown in FIG. 2, the electrode 150 is part of a detection device 170 configured for detecting electrons 204. The detection device 170 may additionally include a carrier element or a substrate 171. The electrode 150 is arranged on the carrier element or the substrate 171. The detection device 170 may be configured to generate a corresponding electrical output signal (e.g., voltage drop across a resistor) based on the electrons 204 trapped by the electrode 150. The electrical output signal is dependent on the number or total charge of the collected electrons 204 and, therefore, on the excitation energy originally deposited in the scintillator 120.

In some embodiments, the detection device 170, as shown in FIG. 2, is arranged compactly in the region of the rear side 121 of the scintillator 120. As shown by FIG. 9, the carrier substrate 171 may extend below the scintillator 120, such that the carrier substrate 171 may be further utilized for bearing or supporting the scintillator 120d.

The arrangement of the conversion device 160 on the lateral wall 123 of the scintillator 120 provides fast access to a large number of scintillation photons 202 by a short route. For example, the first "contact" of a photon 202 with the lateral wall 123 or with a photocathode section 130 provided in the region of the lateral wall 123 may generate an electron 204. The electron 204 may be multiplied further directly in the conversion device 160 or in a channel 165 thereof. In some embodiments, as shown in FIG. 6, a conversion device 160 is provided on each wall of the four lateral walls 123. The radiation may in large part be prevented from being reflected back-and-forth in the scintillator 120, thereby preventing associated losses. As a result, a substantial portion of the radiation may be converted into electrons 204. Thus, the detector element 101 and other detector elements in accordance with the present teachings may have a high efficiency and a high temporal resolution. Detectors that include a plurality of such detector elements, as well as associated imaging systems, may likewise have high efficiencies and high temporal resolutions. As a result, a patient to be examined may be exposed to only a low radiation dose.

The use of the channel structure 161, 162, 163 for electron multiplication may provide a low noise proportion and a low dark rate for the detector element 101 and other detector elements in accordance with the present teachings. The production of electron avalanches in the channels 165 and the generation of a corresponding signal in the detection device 170 may occur only if the scintillator 120 emits radiation and the photocathode 130 generates photoelectrons 204 in response to the scintillation radiation. The channels 165 may be at relatively small distances from one another. As a result, a high filling factor (e.g., ratio of active area to irradiated total area) may be present and detection efficiency may be increased.

The detector element 101 described above uses an evacuated atmosphere or a vacuum at least in the region wherein the free electrons 204 are present (e.g., starting from generation in the photocathode sections 130 through to detection with the detection device 170). Thus, each channel 165 of the conversion device 160 may be individually closed or sealed and, therefore, under vacuum. Sealing may be achieved at the opposite ends of the channels 165 with the aid of electrode 150 and counterelectrode 140. In some embodiments, all of the channels 165 of the conversion device 160 may be sealed together (e.g., a "global" sealing). Thus, the detector element 101 may include a housing, such as housing 190 shown in FIG. 9.

In some embodiments, the conversion device 160 arranged on the lateral wall 123 of the scintillator 120 includes a combination of a planar or two-dimensional microchannel plate having channels 165 arranged on a line or in a plane and a photocathode 130. As described above, the conversion device 160 may be constructed in various ways.

Figure 3:
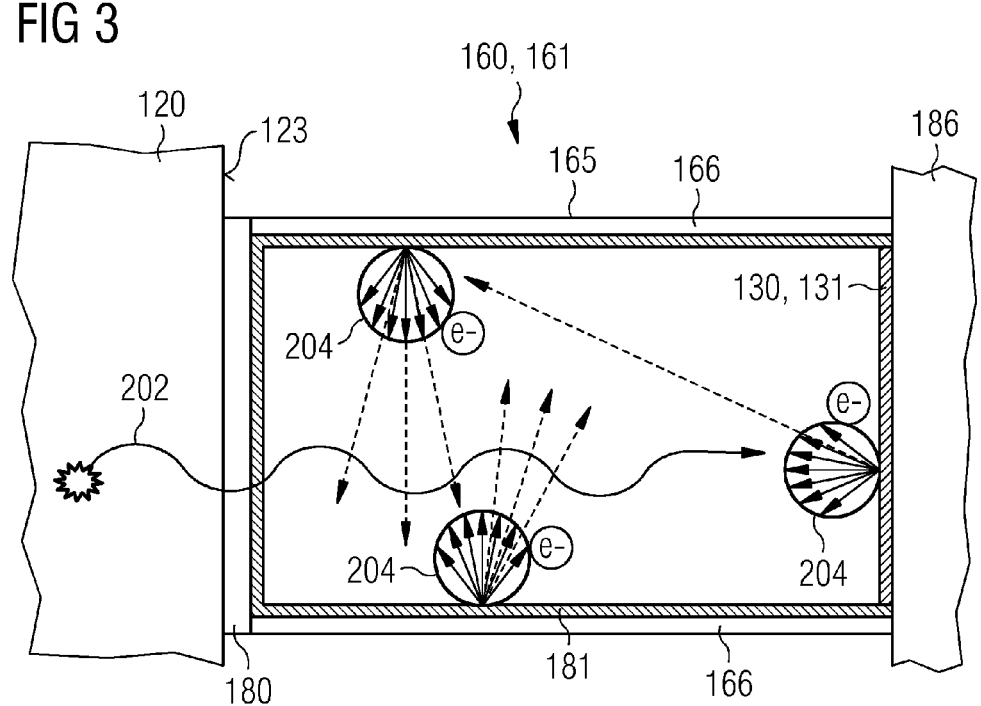
FIG. 3 shows a plan view of a portion of a first exemplary plate-shaped conversion device arranged on a scintillator.

In some embodiments, as shown in FIG. 3, a plate-shaped conversion device 160 having a channel structure 161 may be formed from a structured substrate. The lateral wall 123 of the scintillator 120 that supports the conversion device 160 or the channel structure 161 thereof may be planar. Although FIG. 3 shows only an individual channel 165 of the channel structure 161, the construction shown in FIG. 3 may be applicable to all channels 165 of the channel structure 161. Thus, as shown in FIG. 4, multiple channels 165 may be provided alongside one another on the lateral wall 123 of the scintillator 120.

Figure 10:
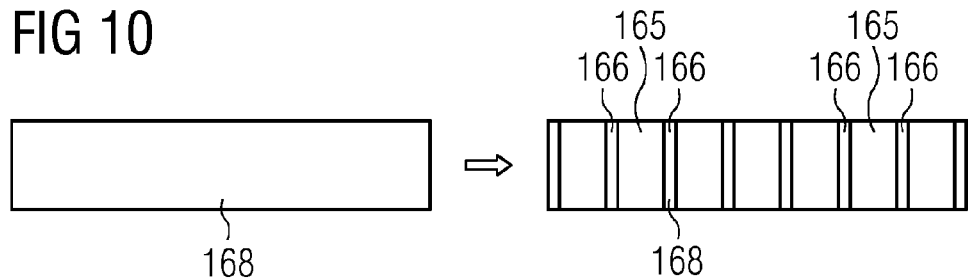
FIGS. 10 to 13 show schematic illustrations of an exemplary process for producing the exemplary detector element of FIG. 8. The detector element includes a first scintillator, a second scintillator, and conversion devices assigned to the first scintillator and the second scintillator.

As shown in FIG. 3, the channel 165 has a rectangular geometry in plan view. The longitudinal axis of the channel 165 runs perpendicularly to the plane of the drawing in FIG. 3. Each of the opposing sides of the channel 165 includes a cell or channel wall 166 in the form of a web. The channel walls 166 may result from structuring or production of trenches in a substrate 168, as shown in FIG. 10. The channel walls 166 are connected at one end to the lateral wall 123 of the scintillator 120 or to a layer 180 optionally provided on the lateral wall 123.

The layer 180 includes an optical input or entrance window for the channel 165. Scintillation photons 202 emitted in the direction of the lateral wall 123 of the scintillator 120 may be coupled into the channel 165 (e.g., into an evacuated interior enclosed by the channel 165) via the optical input or entrance window. In some embodiments, the layer 180 includes a material that is transmissive to the scintillation radiation generated by the scintillator 120. In some embodiments, the layer 180 provides an antireflection layer in order to minimize or suppress reflection of the scintillation radiation at the lateral wall 123. As a result, the layer 180 may further improve the detection efficiency. The lateral wall 123 of the scintillator 120 may be substantially completely covered by the layer 180. The layer 180 may serve as an entrance window and antireflection layer for all of the channels 165 of the associated channel structure 161. Furthermore, in some embodiments, the layer 180 may provide vacuum-tight closure of the channels 165 in the region of the lateral wall 123 of the scintillator 120.

As shown in FIG. 3, the channel walls 166 of the channel 165 are connected to a section 186 that may extend along all channels 165 of the channel structure 161 and that is provided at an opposite end relative to the layer 180. In some embodiments, the section 186 may be provided as a separate substrate or carrier element. The section 186 may be connected to the channels walls 166 or the corresponding structured initial substrate 168. Vacuum-tight closure of the channels 165 may likewise be effected by the section 186.

As further shown in FIG. 3, a section 131 of a photocathode 130 is arranged on a side of the carrier section 186 facing the enclosed interior of the channel 165. A reflection photocathode is reflectively operated. The reflection photocathode emits photoelectrons 204 from the side where radiation from the scintillator 120 impinges. In some embodiments, the photocathode section 131 is solid and has a relatively large thickness or layer thickness. The solidity and large thickness may provide high reliability and efficiency in the conversion of radiation emitted by the scintillator 120 into photoelectrons 204.

FIG. 3 shows separate photocathode sections 131 assigned only to individual channels 165 on the section 186. As shown in FIG. 8, all photocathode sections 131 of the channels 165 may be provided as a continuous (e.g., reflection) photocathode 130 arranged on the section 186, thereby providing a simple and cost-effective production. In some embodiments, the channel walls 166 of the channels 165 may be connected to the carrier section 186 via the photocathode 130.

As further shown in FIG. 3, the interior enclosed by the channel 165 may be provided with an additional wall coating 181. The wall coating 181 may be arranged both on the web-shaped channel walls 166 and on the layer 180. The wall coating 181 facilitates liberation of a multiplicity of electrons 204 in response to an impact by an individual electron 204, thereby further increasing detection efficiency. In some embodiments, the wall coating 181 includes a material having high secondary electron emission.

FIG. 3 further illustrates the process of generating and multiplying electrons 204 in the channel 165 of the channel structure 161. The scintillation photons 202 emitted by the scintillator 120 to the lateral wall 123 may penetrate through the layer 180 and the region of the wall coating 181 arranged thereon. The scintillation photons 202 may enter into the interior of the channel 165, pass further to the reflective photocathode section 131, and be absorbed by the reflective photocathode section 131. The photocathode section 131 may emit electrons 204. In some embodiments, as shown in FIG. 4, the electrons 204 may be accelerated in the direction of the electrode 150 by the electrode 150 and the counterelectrode 140. FIG. 4 shows an exploded perspective view proceeding from the scintillator 120, wherein the scintillator 120 and the layer 180 are omitted. Due to the small lateral dimensions of the channel 165, the electrons 204 may impact the wall or the wall coating 181 and multiply during this movement. Upon each impact, additional electrons 204 may be released or ejected. The additional electrons 204 may likewise be accelerated within the channel 165 and liberate even further additional electrons 204 as a result of impacts with the wall coating 181. The electrons 204 thus multiplied are trapped at the end of the channel 165 by the electrode 150.

Figure 5:
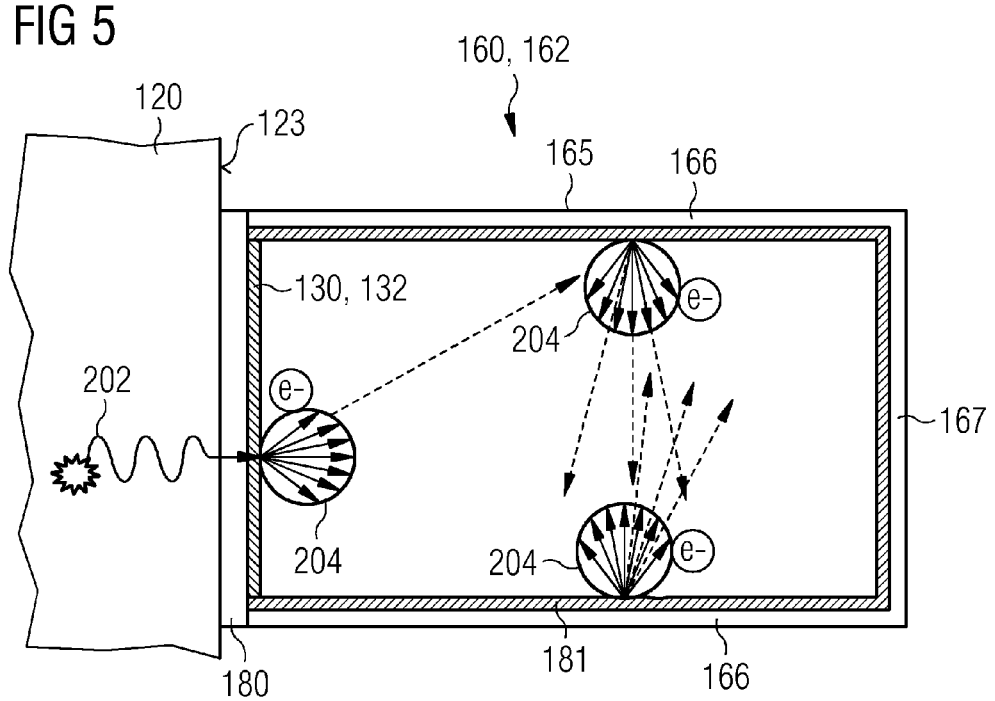
FIG. 5 shows a plan view of a portion of a second exemplary plate-shaped conversion device arranged on a scintillator.

FIG. 5 shows a plate-shaped conversion device 160 having a channel structure 162 analogous to the channel structure 161 described above. The channel structure 162 may likewise be obtained from a structured substrate. In some embodiments, the lateral wall 123 of the scintillator 120 that supports the conversion device 160 or the channel structure 162 thereof is planar. Although FIG. 5 shows only an individual channel 165 of the channel structure 162, the construction shown in FIG. 5 may be applicable to all channels 165 of the channel structure 162. Thus, multiple channels 165 may be provided alongside one another on the lateral wall 123 of the scintillator 120.

As shown in FIG. 5, the channel 165 once again has a rectangular geometry in plan view. The longitudinal axis of the channel 165 runs perpendicularly to the plane of the drawing in FIG. 5. The channel 165 includes a pair of opposing channel walls 166. The channel walls 166 are connected to one another at one end by a further channel wall 167. The further channel wall 167 may extend along all channels 165. In some embodiments, as shown in FIG. 5, all of the channel walls 166 of the individual channels 165 may be connected to the further channel wall 167. In some embodiments, the channel walls 166 and the further channel wall 167 may be obtained by forming trenches in a substrate and removing substrate regions between the channel walls 166 and the further channel wall 167.

The channel walls 166 are connected to the lateral wall 123 of the scintillator 122 or to a layer 180 optionally provided on the lateral wall 123 at an opposite end relative to the further channel wall 167. The layer 180 may provide an entrance window for the channel 165 or the plurality of channels 165 of the channel structure 162. The layer 180 may further provide an antireflection layer, and, in some embodiments, a vacuum-tight closure of the channels 165 in the region of the lateral wall 123. The above description provided in relation to FIG. 3 is likewise applicable in reference to the layer 180.

As further shown in FIG. 5, a section 132 of a photocathode 130 is arranged on a side of the layer 180 facing the enclosed interior of the channel 165. A semitransparent photocathode or transmission photocathode that operates transmissively may be used. In some embodiments, the photocathode section 132 is irradiated at the side facing the scintillator 120, and the electrons 204 are emitted at the opposite side of the photocathode section 132 into the interior enclosed by the channel 165.

FIG. 5 further shows separate photocathode sections 132 assigned only to individual channels 165 on the layer 180. In alternative embodiments, all photocathode sections 132 of the channels 165 may be present in the form of a continuous (e.g., semitransparent) photocathode 130 arranged on the layer 180, thereby providing a simple and cost-effective production. In some embodiments, the channel walls 166 of the channels 165 may be connected to the layer 180 via the photocathode 130.

As further shown in FIG. 5, an additional wall coating 181 is provided in the interior enclosed by the channel 165. The additional wall coating 181 may be arranged both on the channel walls 166 and on the channel wall 167. The wall coating 181 facilitates liberation of a multiplicity of electrons 204 in response to an impact from an individual electron 204.

FIG. 5 further illustrates the process of generating and multiplying electrons 204 in the channel 165 of the channel structure 162. The scintillation photons 202 emitted by the scintillator 120 to the lateral wall 123 may penetrate through the layer 180. The scintillation photons 202 may be absorbed by the photocathode section 132. The photocathode section 132 may emit electrons 204 into the interior of the channel 165. The emitted electrons 204 may be accelerated in the direction of the electrode 150 by the electrode 150 and the counterelectrode 140 (e.g., see FIG. 1) that are arranged at the ends of the channel structure 162. Due to the small lateral dimensions of the channel 165, the electrons 204 may impact the wall or the wall coating 181, and multiply during movement. Upon each impact, additional electrons 204 may be liberated. The liberated electrons 204 may likewise be accelerated within the channel 165 and contribute to electron multiplication as a result of impacts. The electrons 204 thus multiplied are trapped at the end of the channel 165 by the electrode 150.

Materials used in semiconductor and detector technologies may also be used to produce the detector components of detector elements in accordance with the present teachings as well as variations thereof. For example, an inorganic material or a crystal may be used for the scintillator 120. In some embodiments, the scintillator 120 is a "fast" scintillator, wherein the scintillation mechanism (e.g., the conversion of incident high-energy radiation into lower-energy scintillation radiation) takes place in a short duration of time. By way of example, a representative material for a fast scintillator is CsF or LSO. In some embodiments, the lateral dimensions or width of the scintillator 120 may range from a few 100 µm to a few mm, and the height may range from a few mm to a few tens of mm. In some embodiments, the scintillator 120 has an aspect ratio that is substantially greater than one. For PET applications, the aspect ratio may be greater than 7:1.

Figure 14:
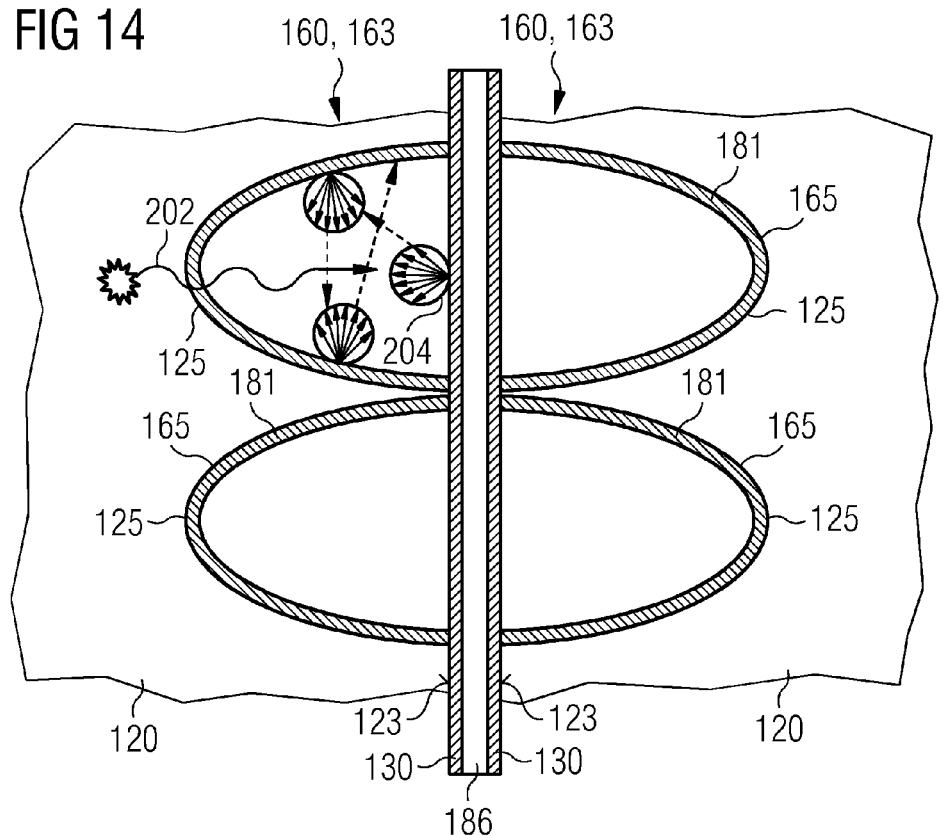
FIG. 14 shows a cross-sectional plan view of an example of two scintillators arranged side-by-side and conversion devices assigned to the scintillators. The channels of the conversion devices are provided as depressions in the scintillators.

By way of further example, materials such as CsI, CsTe, Cs3Sb, diamond, and GaN may be used for the photocathode 130 or the photocathode sections 131, 132. In some embodiments, the photocathode material is coordinated with the material of the scintillator 120 in such a way that the scintillation radiation coming from the scintillator 120 may be converted into free electrons 204 in the photocathode 130 or the photocathode sections 131, 132. In some embodiments, the photocathode 130 may be provided as a continuous photocathode 130 or as a layer for all channels 165 of the conversion device 160, thereby simplifying and increasing cost-efficiency of production. In some embodiments (e.g., as shown in FIGS. 3, 8, and 14), the photocathode 130 may be arranged on a separate carrier element 186 and simultaneously serve as a channel wall for the channels 165. In alternative embodiments, separate photocathode sections 131 and 132 may be used. The separate photocathode sections 131 and 132 may be arranged separately from one another in the channels 165 on corresponding sections or wall sections.

FIG. 3 shows an exemplary arrangement of the section 186, and FIGS. 3 and 5 show an exemplary arrangement of the layer 180.

In some embodiments, a semiconductor material (e.g., silicon or a glass material) may be used to form the channel walls 166 and the further channel wall 167 of the channel structures 161, 162 shown, respectively, in FIGS. 3 and 5. In some embodiments, a semiconductor material (e.g., silicon or a glass material) may be used to form the starting substrate. The channel structures 161, 162 (and, therefore, the channel walls 166, 167) or other plate-shaped channel structures are formed from the substrate. Such materials facilitate simple structuring, and provide high dimensional stability. In some embodiments, the materials include a wall coating 181 having high secondary electron emission. In some embodiments, the wall coating 181 may be formed by chemical vapor deposition (CVD). In some embodiments, the CVD is carried out after trenches for the channels 165 have been formed in the corresponding substrate. In some embodiments, the wall coating 181 may be omitted. In other embodiments, the wall coating 181 is provided only in a partial region. The length of the channels 165 may be equal to the height of the scintillator 120. Thus, in some embodiments, the lateral dimensions of the channels 165 may range from a few tens of µm to a few hundreds of µm.

The section 186 shown in FIG. 3 may be a separate carrier element containing, for example, aluminum oxide. The carrier element may be coated with the photocathode 130 or photocathode section 131 and arranged on the channel structure 161 or a differently configured channel structure. In some embodiments, the section 186 is not a separate element but rather a section of an initial substrate that remains after the substrate was subjected to structuring for the production of the channels 165 and the channel walls 166. The section 186 may include a semiconductor material (e.g., such as silicon or a glass material).

In some embodiments, the layer 180 configured to serve as an entrance window may include silicon oxide (SiOx) or silicon nitride and may be provided in the form of a glass window. The materials that form the layer 180 may be fully transparent to scintillation radiation emitted by the scintillator 120. Since the materials may be configured for emitting secondary electrons 204, the wall coating 181, in some embodiments, may be partially omitted from the layer 180.

In some embodiments, the layer 180 provides an antireflection layer on the lateral wall 123 of the scintillator 120. In such embodiments, the layer 180 may have a thickness corresponding to one-quarter of the wavelength of the scintillation radiation or a multiple thereof (e.g., "quarter-wave layer"). In some embodiments, radiation reflection may be substantially suppressed as a result. If LSO is used as a scintillator material, the scintillation radiation may have a wavelength of about 420 nm, and the layer 180 may have a thickness of about 55. The layer thickness may be achieved reliably and accurately by providing the layer 180 as a thin silicon oxide layer. If LSO is used as a scintillator material having a refractive index of 1.82, and the layer 180 includes silicon oxide having a refractive index of 1.48, a reflection of less than 1% at the lateral wall 123 (e.g., the interface) may be achieved.

In some embodiments, the layer 180 may be provided as a glass window bonded to the lateral wall 123 or as a coating on the lateral wall 123 that contains, for example, silicon oxide or silicon nitride. In alternative embodiments, the layer 180 is provided as part of the channel structures 161, 162 or differently constructed plate-shaped channel structures. By way of example, the layer 180 may be provided on an initial substrate. The channels 165 extending to the layer 180 may be subsequently formed in the substrate by structuring the substrate such that the layer 180 provides an entrance window for the channels 165. Such a structured substrate provided with the layer 180 may subsequently be arranged on the lateral wall 123 of the scintillator 120, as shown in FIGS. 3 and 5.

In alternative embodiments, the optional layer 180 may be omitted, and a structured substrate of a channel structure (e.g., the channel structures 161, 162 shown in FIGS. 3 and 5, respectively) may be arranged directly on the lateral wall 123 of the scintillator 120. In some embodiments, the wall coating 181 or a portion thereof may be arranged directly on the lateral wall 123. In some embodiments, a semitransparent photocathode 130 or a photocathode section 132 may be arranged directly on the lateral wall 123 of the scintillator 120.

In some embodiments, the electrode 150 and the counterelectrode 140 used for accelerating and detecting electrons 204 may be planar and formed from an electrically conductive or metallic material. The detection device 170 or the carrier substrate 171 may include a semiconductor substrate or a silicon substrate. The electrode 150 for trapping the electrons 204 may be arranged on the semiconductor substrate or the silicon substrate. In some embodiments, the detection device 170 may include an application specific integrated circuit (ASIC). Thus, the detection device 170 may be configured for detecting or reading a total charge of an electron avalanche, for generating an output signal based on the total charge, and for at least partially conditioning or evaluating the output signal.

Exemplary configurations of detector elements are now described in reference to the drawing figures. In some embodiments, the above description of various aspects and components in accordance with the present teachings (e.g., vis-à-vis functioning, materials, dimensions, advantages, etc.) is applicable to corresponding aspects and components that will now be described in reference to the figures. Features of various representative embodiments of detector elements described below may also apply to other embodiments of detector elements described herein.

FIG. 6 shows an exploded perspective view of component parts of a detector element 102. The detector element 102 includes a parallelepipedal scintillator 120 and a conversion device 160 on each of the four lateral walls 123 of the scintillator 120. In some embodiments, the conversion device 160 includes a configuration of a type described hereinabove. As further shown in FIG. 6, the detector element 102 includes an electrode 150 and a counterelectrode 140 arranged in the region of the first end face 121 and the second end face 122 of the scintillator 120. The electrode 150 and the counterelectrode 140 are configured for generating an electric field. The electrons 204 generated in the conversion devices 160 may be accelerated in the direction of the electrode 150 and may be trapped by the electrode 150. In some embodiments, the electrode 150 is a component of a detection device 170 and may be arranged on a carrier substrate 171 thereof. The electrode 150 and the counterelectrode 140 may be provided with a frame-shaped structure, in a manner analogous to the conversion devices 160 that peripherally surround the scintillator 120.

The detector element 102 may be configured to separately detect the electrons 204 generated and multiplied in different conversion devices 160. As shown in FIG. 6, the electrode 150 includes four segments or electrode regions 155. Each electrode region 155 of the four electrode regions 155 is assigned to a corresponding individual conversion device 160. The electrons 204 "originating" from the individual conversion devices 160 may be detected separately from one another via the corresponding electrode regions 155. Thus, corresponding output signals may be generated using the amount of charge detected by the individual electrode regions 155.

From the separate and segment-by-segment detection of electrons 204 generated by the different conversion devices 160, the lateral location of the interaction ("x/y position") of a radiation quantum 200 exciting the scintillator 120 may be determined simply and accurately. In some embodiments, the fact that one or more of the point in time, the temporal development, and the magnitude of the charge signals obtained by the electrode regions 155 is dependent on the proximity of the interaction to the respective lateral walls 123 that support the conversion devices 160 may be used. In order to determine the lateral interaction location, for example, summation signals, difference signals, or summation signals and difference signals may be formed from the individual signals. In some embodiments, the detection device 170 includes an ASIC circuit and may form these signals itself.

Determination of a lateral interaction location in the scintillator 120 may be used in an imaging system wherein the associated detector is constructed from a plurality of the detector elements 102. In addition to high efficiency and high temporal resolution, the relevant detector may further have high lateral spatial resolution even for relatively large lateral dimensions of the scintillator.

In some embodiments, as shown in FIGS. 2 and 6, the detection device 170 includes an electrode 150 (e.g., a trapping electrode or anode) in the region of the rear side 121 of the scintillator 120, and a counterelectrode 140 (e.g., a cathode) in the region of the front side 122 of the scintillator 120. In alternative embodiments, a reverse configuration may also be used. For example, the detection device 170 may include the electrode 150 in the region of the front side 122, and the counterelectrode 140 in the region of the rear side 121. In some embodiments, the high-energy radiation to be detected may be transmitted (e.g., without interaction) through the detection device 170, and subsequently incident in the scintillator 120. In the scintillator 120, the above-described processes may repeat.

In some embodiments, a cathode-anode structure and detection devices 170 may be provided on both the first end face 121 and the second end face 122 of the scintillator 120. In such a configuration, the electrons 204 of different conversion devices 160 may be moved in different or opposing directions, thereby facilitating the detection of the height or depth of an interaction in the scintillator 120.

FIG. 7 shows a further detector element 103 that includes a parallelepipedal scintillator 120 and a respective conversion device 160 (e.g., constructed in accordance with the present teachings) provided on each of the four lateral walls 123 of the scintillator 120. The detector element 103 further includes a mirror image of the electrode arrangement configured for causing different electron movements.

As further shown in FIG. 7, the electrode arrangement includes a first L-shaped electrode 141 and a second L-shaped electrode 152 in the region of the front side 122 of the scintillator 120. The electrode arrangement further includes a third L-shaped electrode 142 and a fourth L-shaped electrode 151 in the region of the rear side 121 of the scintillator 120. The first L-shaped electrode 141 and the second L-shaped electrode 152 form a first frame-shaped structure configured for peripherally surrounding the scintillator 120, and the third L-shaped electrode 142 and the fourth L-shaped electrode 151 form a second frame-shaped structure also configured for peripherally surrounding the scintillator 120. The first L-shaped electrode 141 and the second L-shaped electrode 152 are arranged on a carrier substrate 171 in the region of the second end face 122 of the scintillator 120. The third L-shaped electrode 142 and the fourth L-shaped electrode 151 are arranged on a carrier substrate 171 in the region of the first end face 121 of the scintillator 120. The first L-shaped electrode 141, the second L-shaped electrode 152, the third L-shaped electrode 142, and the fourth L-shaped electrode 151 may be components of detection devices 170 provided on the first end faces 121 and the second end face 122.

The first L-shaped electrode 141 and the fourth L-shaped electrode 151 aligned one on top of the other as shown in FIG. 7 together form an electrode pair that may be used to accelerate electrons 204 from two of the four conversion devices 160 that adjoin one another or run at right angles with respect to one another in a first direction towards the fourth L-shaped electrode 151. The downward arrow in FIG. 7 shows the direction of an electric field that may be generated by the first L-shaped electrode 141 and the fourth L-shaped electrode 151. In some embodiments, the first L-shaped electrode 141 provides a cathode, and the fourth L-shaped electrode 151 provides an anode and trapping electrode.

The third L-shaped electrode 142 and the second L-shaped electrode 152 aligned one above the other as shown in FIG. 7 also form an electrode pair that may be used to accelerate electrons 204 from the other two conversion devices 160 (e.g., the ones on the right and towards the rear in the plane of the drawing) in an opposite direction towards the second L-shaped electrode 152. This upward arrow in FIG. 7 shows the direction of an electric field that may be generated by the third L-shaped electrode 142 and the second L-shaped electrode 152. In some embodiments, the electrode third L-shaped 142 provides as a cathode, and the second L-shaped electrode electrode 152 provides an anode and trapping electrode.

The height or depth (e.g., "z-position") of an interaction of a radiation quantum 200 exciting the scintillator 120 may be determined from the acceleration and detection of electrons 204 or electron avalanches in different directions. In some embodiments, the fact that one or more of the point in time, the temporal development, and the magnitude of the amount of charge detected via the trapping electrodes (e.g., the fourth L-shaped electrode 151 and the second L-shaped electrode 152) is dependent on the proximity of the interaction to the front side 122 or rear side 121 of the scintillator 120 may be used. In some embodiments, summation signals, difference signals, or summation signals and difference signals may be formed from the individual measurement signals obtained by the trapping electrodes (e.g., the fourth L-shaped electrode 151 and the second L-shaped electrode 152) or the detection device 170.

In an alternative configuration to that shown in FIG. 7, the electrode pair that includes first L-shaped electrode 141 and fourth L-shaped electrode 151 may be used to produce an upward electron movement in the direction of the first L-shaped electrode 141 and the front side 122 of the scintillator 120. The electrode pair that includes third L-shaped electrode 142 and second L-shaped electrode 152 may be used to produce a downward electron movement in the direction of the third L-shaped electrode 142 and the rear side 121 of the scintillator 120. These electron movements may be defined by the voltage applied, respectively, to the first electrode pair (e.g., that contains the first L-shaped electrode 141 and the fourth L-shaped electrode 151) and the second electrode pair (e.g., that contains the third L-shaped electrode 142 and the second L-shaped electrode 152). In embodiments based on the above-described "mirror image" functioning, the functions of the first L-shaped electrode 141, the second L-shaped electrode 152, the third L-shaped electrode 142, and the fourth L-shaped electrode 151 as cathode and anode (e.g., trapping electrode) may be interchanged relative to the original type of functioning. In some embodiments, the detector element 103 is configured to provide a flexible mode of operation. In the flexible mode of operation, each of the first L-shaped electrode 141, the second L-shaped electrode 152, the third L-shaped electrode 142, and the fourth L-shaped electrode 151 may be independently selected to operate as a cathode or an anode. In some embodiments, the first L-shaped electrode 141, the second L-shaped electrode 152, the third L-shaped electrode 142, and the fourth L-shaped electrode 151 may be driven in such a way that the first electrode pair (e.g., that contains the first L-shaped electrode 141 and the fourth L-shaped electrode 151) and the second electrode pair (e.g., that contains the third L-shaped electrode 142 and the second L-shaped electrode 152) move electrons in the same direction.

In some embodiments, a detector element includes more than a single scintillator 120. For example, in some embodiments, modular configurations of detector elements may also be used in accordance with the present teachings. The modular configurations may include a plurality of scintillators 120 arranged alongside one another. In some embodiments, the conversion devices 160 assigned to the individual scintillators 120 and configured for converting scintillation radiation into multiplied electrons 204 may be arranged in interspaces between the scintillators 120 on opposite lateral walls 123 of the scintillators 120. Exemplary configurations will now be described in reference to the drawing figures.

FIG. 8 shows a plan view of two parallelepipedal scintillators 120 arranged alongside one another and the conversion devices 160 assigned to the scintillators 120. The conversion devices 160 are arranged in an interspace between the scintillators 120 on opposite lateral walls 123 of the scintillators 120. The conversion devices 160 are plate-shaped with the channel structure 161 as described above in reference to FIG. 3. In some embodiments, the web-shaped channel walls 166 of the channels 165 are connected at one end to the lateral wall 123 of the associated scintillator 120 or to the layer 180 (e.g., entrance window) optionally provided on the lateral wall 123, and at an opposite end to a carrier element 186 provided with a reflective photocathode 130 on both sides thereof. The carrier element 186 is assigned to the two conversion devices 160 or channel structures 161. The channels 165 of the two channel structures 161 are closed by the coated carrier element 186. Each channel 165 of the two channel structures 161 is provided with an associated photocathode section 131. The joint utilization of the carrier element 186 for both conversion devices 160, and the coating of the carrier element 186 on both sides thereof with the photocathodes 130, provides a simple and cost-effective configuration for a detector.

FIG. 9 shows a perspective view of a detector element 104 that includes a structure as shown in FIG. 8. The detector element 104 includes two scintillators 120 arranged side-by-side, and associated conversion devices 160. The carrier element 186 provided with photocathodes 130 is provided in the interspace between the scintillators 120. The detector element 104 further includes the electrode 150 and the counterelectrode 140 (e.g., provided at the ends of the channels 165 and configured for accelerating and trapping electrons 204), and a carrier substrate 171 or a detection device 170 assigned to the scintillators 120. In some embodiments, the two scintillators 120 may be placed on or supported by the carrier substrate 171. The electrode 150 may be configured for joint or, in alternative embodiments, separate (e.g., segment-by-segment) trapping of the electrons 204 of the individual conversion devices 160. In some embodiments, the electrode 150 may include electrode regions assigned to the individual conversion devices 160 analogous to the configuration shown in FIG. 6. In other embodiments, the electrode 150 may be subdivided into separate electrodes (not shown).

FIG. 9 further shows a housing 190 arranged on the carrier substrate 171. The housing 190 surrounds the scintillators 120 and may be used for providing a vacuum (e.g., global) or an evacuated environment for all of the channels 165 of the conversion devices 160. The housing 190 may also be used for carrying the counterelectrode 140.

The conversion devices 160 may be arranged on each wall of the four lateral walls 123 of the scintillators 120. In some embodiments, the electrode 150 and the counterelectrode 140 may be configured for accelerating and trapping electrons 204 of the two scintillators 120. In some embodiments, the electrode 150 and the counterelectrode 140 may include a respective frame-shaped section per scintillator 120 in a configuration analogous to that shown in FIG. 6. In some embodiments, the electrode 150 may include electrode regions assigned to the individual conversion devices 160. In other embodiments, the electrode 150 may be subdivided into separate electrodes, and may detect a lateral interaction location in the scintillators 120. In some embodiments, in a configuration analogous to that shown in FIG. 7, one frame-shaped cathode-anode structure and detection device 170 may be provided on each of the first end face 121 and the second face 122 of the scintillators 120. As a result, the electrons 204 of different conversion devices 160 of the scintillator 120 may be accelerated in different directions. By detecting these electrons 204, an "interaction depth" in the scintillators 120 may be determined.

In some embodiments, the detector element 104 includes more than two scintillators 120 arranged side-by-side. In some embodiments, the scintillators 120 may be arranged as rows and columns alongside one another in a pixel- or matrix-type fashion on the carrier substrate 171. The housing 190 may be used to surround the scintillators 120 as described above. In some embodiments, the conversion devices 160 may be arranged on each wall of the four lateral walls 123 of the scintillators 120. The conversion devices 160 may be provided in the interspace between two scintillators 120 as shown in FIGS. 8 and 9.

A plate-shaped conversion device 160 having a channel structure 161 as shown in FIG. 3 may be provided on the lateral wall 123 of the scintillator 120, thereby providing a space-saving, simple, and cost-effective configuration. As shown in FIG. 8, the carrier element 186 coated on each side with the photocathode 130 may be used for the two conversion devices 160.

FIGS. 10 to 13 illustrate a process for producing the structure shown in FIG. 8 that includes two scintillators 120 arranged side-by-side, As shown in FIG. 10, a planar substrate 168 (e.g., a thin silicon substrate) is provided for each of the conversion devices 160. The channels 165, or trenches that may serve as precursors to the channels 165, are produced in the substrate 168. The channel walls 166 separate the channels 165 from each other. In some embodiments, a dry etching process may be used in the production process. The trenches or channels 165 extend perpendicularly from the plane of the drawing in FIGS. 10 to 13, and run parallel to the plane of the drawing at a top-side and an underside. The trenches or channels 165 adjoin corresponding plate-shaped sections of the substrate 168 that connect the channel walls 166.

Figure 11:
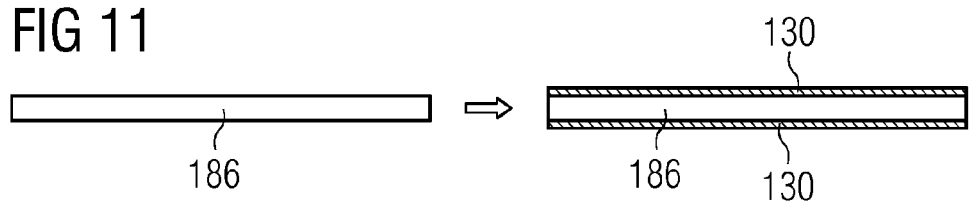

As shown in FIG. 11, a carrier element 186 (e.g., a substrate or a plate that contains aluminum oxide) may be provided. A photocathode material for a photocathode 130 is deposited on both sides of the carrier element 186. In some embodiments, by way of example, GaN may be deposited by a CVD method.

Figure 12:
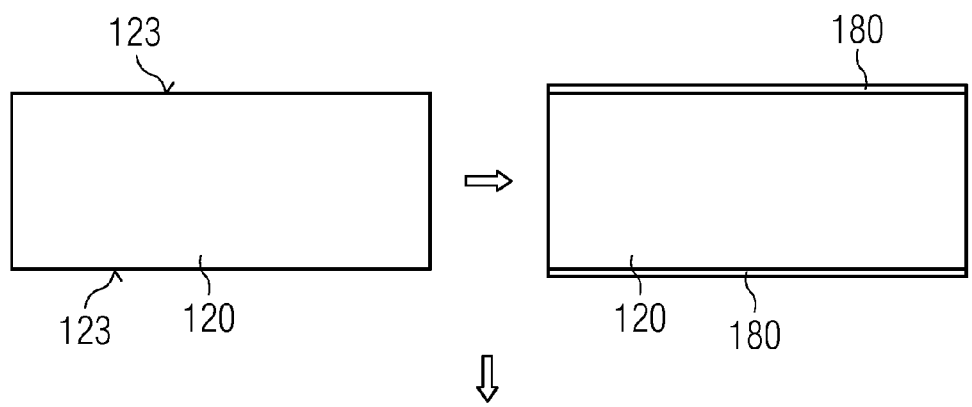

As shown in FIG. 12, the scintillators 120 are provided with a layer 180 configured to provide an entrance window on the lateral walls 123 of the scintillator 120. As shown in FIG. 12, the layer 180 is provided on both lateral walls 123 of the scintillator 120. In some embodiments, the scintillator material includes LSO. In some embodiments, the layer 180 is a silicon oxide layer having a layer thickness of about 55 nm that may be deposited by a coating method.

Figure 13:
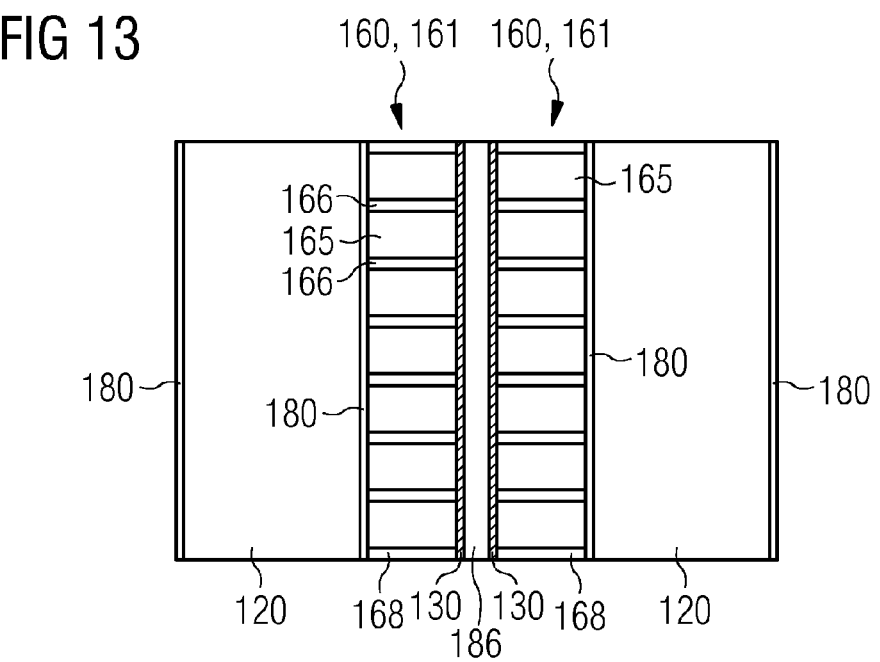

As shown in FIG. 13, the two structured substrates 168 are interposed between the two scintillators 120 that are coated with the layers 180. The carrier 186 provided with the photocathodes 130 is positioned as shown in FIG. 13, such that the photocathodes 130 are connected to one another (e.g., "clamped together"). In some embodiments, the conversion devices 160 provided on the lateral walls 123 of the scintillators 120, or the channel structures 161 of the conversion devices 160, are configured as described above.

The topside and underside of the substrates 168 that run parallel to the plane of the drawing in FIGS. 10 to 13 and that connect the channel walls 166 may be removed to expose the opposite ends of the channels 165. In some embodiments, the removal is achieved by chemical mechanical polishing (CMP). The electrode 150 and the counterelectrode 140 (or corresponding electrode sections) may be provided at the ends of the channels 165 on a corresponding carrier substrate 171 to form a structure as shown in FIG. 9.

The process described above may also be used to produce a configuration that includes a plurality of scintillators 120. In some embodiments, the scintillators 120 in the plurality of scintillators 120 are arranged in a matrix-type fashion with respect to one another. In some embodiments, two scintillators 120 may be connected as shown in FIG. 13. In some embodiments, the outer lateral walls 123 of the scintillators 120 at the edge of the matrix may be left uncoated. In other embodiments, structured substrates 168 and carrier elements 186 coated with a photocathode 130 on only one side thereof may be provided on the scintillators 120 at the edge of the matrix.

A modular configuration of a detector element includes a plurality of scintillators 120 arranged side-by-side. In some embodiments, the conversion devices 160 include a differently constructed channel structure than the channel structure 161 shown in FIG. 3. In some embodiments, as shown in FIG. 5, the channel structure 162 having the semitransparent photocathode 130 may also be used. In some embodiments, in a configuration analogous to that shown in FIG. 8, two channel structures 162 may be arranged in in the interspace between the two scintillators 120 on opposite lateral walls 123 thereof.

In some embodiments, the two channel structures 162 provided in an interspace may be "combined" to form a common channel structure on both sides. By way of example, the channel wall 167 shown in FIG. 5 may function as a central web. The channels 165 shown in FIG. 5 may be provided as a mirror image on the opposite side of the central web, such that the channel walls 166 extend laterally from the channel wall 167. In contrast to the "one-sided" construction shown in FIG. 5, the channel walls 166 may be provided on both sides of the channel wall 167. In some embodiments, a configuration that includes the channel walls 166 extending on both sides of the channel wall 167 may be produced by forming trenches in a substrate and removing substrate regions between the channel walls 166 and the channel walls 167.

The channel structure 162 and variants thereof may be used in one or more of the following configurations: conversion devices 160 provided on each wall of the lateral walls 123 of a scintillator 120; a matrix arrangement that includes a plurality of scintillators 120; and an electrode structure that includes the electrode 150 and the counterelectrode 140 having frame-shaped sections per scintillator 120. In some embodiments, the channel structure 162 and variants thereof may be used in separate or segment-by-segment detection of electrons 204 of different conversion devices 160 (e.g., in accordance with the approach shown in FIG. 6). In some embodiments, the channel structure 162 and variants thereof may be used when causing different electron movements (e.g., in accordance with the approach shown in FIG. 7). The electrode arrangements configured for use in the above-described embodiments (e.g., separate electrode regions, electrode pairs for different conversion devices) include the configurations described above.

A detector in accordance with the present teachings, wherein a conversion device 160 is provided on at least one lateral wall 123 of a scintillator 120, is not restricted to plate-shaped conversion devices 160 having channel structures that include a structured substrate (e.g., channel structure 161 or channel structure 162).

In some embodiments, a conversion device 160 includes a channel structure 163 wherein the channels 165 are formed by cutouts or depressions 125 in the lateral wall 123 of the scintillator 120. As a result, the scintillator 120 includes a lateral wall 123 having a structured surface. The structure surface provides a space-saving, simple, and cost-effective configuration that may be used in modular configurations that include a plurality of scintillators 120. Exemplary embodiments will now be described in reference to the drawing figures.

Figure 15:
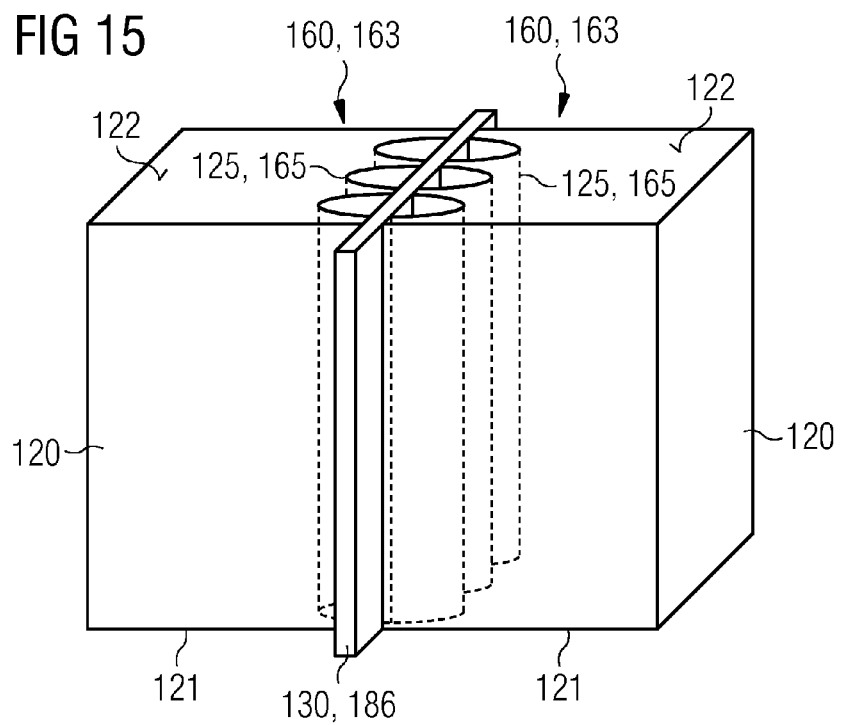
FIG. 15 shows a perspective view of the two exemplary scintillators shown in FIG. 14.

FIG. 14 shows a plan view of two scintillators 120 arranged side-by-side that include conversion devices 160 or channel structures 163 on the lateral walls 123. FIG. 15 shows a perspective view of the substantially parallelepipedal scintillators 120.

In some embodiments, the opposing lateral walls 123 of the scintillators 120 have depressions 125. The channels 165 are formed through the depressions 125. The depressions 125 and, therefore, the channels 165, run parallel to a longitudinal axis of the respective scintillator 120 that extends between the first end face 121 and the second end face 122. In plan view, the depressions 125 and, therefore, the channels 165, may have an elliptic or oval geometry. In alternative embodiments, other shapes (not shown) may be used for the depressions 125 (e.g., rectangular, triangular) and, therefore, for the channels 165.

As shown in FIG. 14, the carrier element 186 provided with reflective photocathodes 130 on both sides thereof may be arranged in an interspace between the scintillators 120, thereby closing the depressions 125 and, therefore, the channels 165 of the conversion devices 160 on the lateral walls 123 of the associated scintillators 120. The channels 165 may be assigned corresponding sections of the photocathode 130 configured for converting scintillation photons 202 into photoelectrons 204. The scintillation photons 202 may be emitted in the direction of the respective lateral wall 123 of the scintillator 120 and enter into the channels 165 as described above.

As further shown in FIG. 14, the depressions 125 of the scintillators 120 may be provided with a wall coating 181. In some embodiments, the wall coating 181 includes silicon oxide. In a manner analogous to that described above in reference to FIGS. 3 and 5, the wall coating 181 may be configured to liberate a multiplicity of electrons 204 for each impact by an individual electron 204 with the channel wall. In some embodiments, the wall coating 181 includes a material having high secondary electron emission.

FIG. 14 further shows the process of generating and multiplying electrons 204 in the channel 165 of the channel structure 163. The scintillation photons 202 emitted by the scintillator 120 in the direction of the lateral wall 123 may penetrate through the semitransparent wall coating 181, enter into the interior of the channel 165, pass further to the reflective photocathode 130, and be absorbed by the photocathode 130. The photocathode 130 may emit electrons 204 into the interior of the channel 165. The electrons 204 are liberated as a result of impacts with the wall coating 181. The electrons 204 may also contribute to electron multiplication within the channel 165 as a result of impacts with the wall coating 181. In some embodiments, the electrons 204 may be accelerated along the channels 165, and the corresponding electrode 150 and counterelectrode 140 may be provided at the ends of the channels 165.

Figure 16:
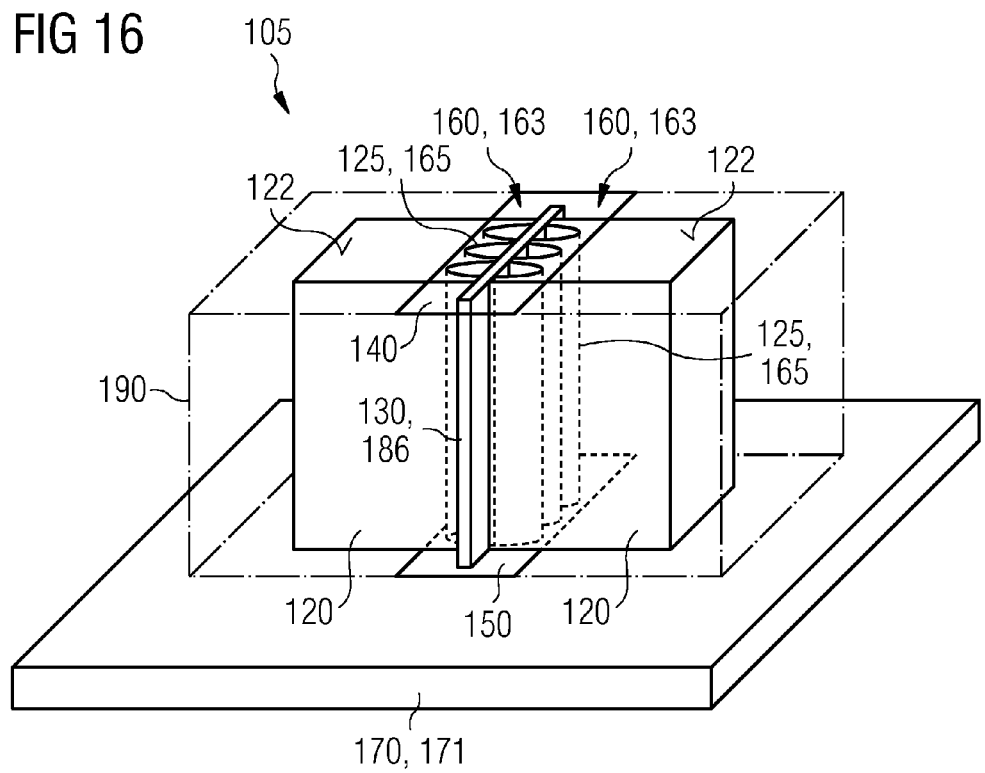
FIG. 16 shows a perspective view of the exemplary scintillators of FIG. 15 together with an exemplary detector element.

FIG. 16 shows a detector element 105 analogous to that shown in FIGS. 14 and 15. The detector element 105 includes the electrode 150 and the counterelectrode 140 configured for accelerating and trapping the electrons 204. The detector element 105 further includes a carrier substrate 171 or a detection device 170. In some embodiments, the two scintillators 120 may be placed on or supported by the carrier substrate 171. The electrode 150 may be configured for joint or, in alternative embodiments, separate (e.g., segment-by-segment) trapping of the electrons 204 of the individual conversion devices 160. In some embodiments, the electrode 150 may include electrode regions assigned to the individual conversion devices 160 analogous to the configuration shown in FIG. 6. In other embodiments, the electrode 150 else may be subdivided into separate electrodes (not shown).

FIG. 16 further shows a housing 190 arranged on the carrier substrate 171. The housing 190 may be used for providing a vacuum (e.g., global) for all of the channels 165 of the conversion devices 160. The housing 190 may also be used for carrying the counterelectrode 140.

For the detector element 105, the conversion devices 160 that include channel structures 163 may be arranged on each wall of the four lateral walls 123 of the scintillators 120. In some embodiments, the electrode 150 and the counter electrode 140 may be configured for accelerating and trapping the electrons 204 of the two scintillators 120. In some embodiments, the electrode 150 and the counter electrode 140 may include respective frame-shaped sections per scintillator 120 in a configuration analogous to that shown in FIG. 6. In some embodiments, the electrode 150 may include electrode regions assigned to the individual conversion devices 160. In other embodiments, the electrode 150 may be subdivided into separate electrodes, and may detect lateral interaction locations in the scintillators 120. In some embodiments, in a configuration analogous to that shown in FIG. 7, one frame-shaped cathode-anode structure and detection device 170 may be provided on each of the first end face 121 and the second end face 122 of the scintillators 120. As a result, the electrons 204 of different conversion devices 160 of the scintillator 120 may be accelerated in different directions. By detecting these electrons 204, an "interaction depth" in the scintillators 120 may be determined.

In some embodiments, the detector element 105 includes only one scintillator 120. In other embodiments, the detector element includes more than two scintillators 120 that may be arranged in a matrix-type fashion on the carrier substrate 171. In some embodiments, the conversion devices 160 including the channel structures 163 may be arranged on each wall of the four lateral walls 123 of the scintillators 120. The conversion devices 160 may be provided in the interspace between two scintillators 120 as shown in FIG. 14. The carrier element 186 coated with the photocathode 130 on only one side thereof may be used to close the depressions 125 or channels 165 formed at the respective lateral wall 123. This configuration may be used, for example, in embodiments that include only one scintillator 120 that contains a conversion device 160 or channel structure 163 on at least one lateral wall 123, and for embodiments that contain an outer lateral wall 123 of the scintillator 120 in a scintillator arrangement or scintillator matrix.

The conversion device 160 that includes the channel structure 163 shown in FIG. 14 may be modified. For example, the depressions 125 or a portion thereof may include semitransparent photocathodes or photocathode sections to provide function analogous to channel structure 162 shown in FIG. 5. In some embodiments, a corresponding substrate or carrier element 186 may be used to close the depressions 125 or channels 165 at the lateral wall 123. In some embodiments, a wall coating 181 configured for electron multiplication may be provided adjacent to a photocathode section of the depression 125, and on the carrier element 186 used for closure. The carrier element 186 may be provided with a wall coating 181 on both sides thereof and used for conversion devices 160 that include the channel structures 163 on opposing lateral walls 123 of two scintillators 120.

The side-by-side arrangement of the channels 165 in a plane at a lateral wall 123 of a scintillator 120 in a conversion device 160 that includes one of the above-described channel structures 161, 162, 163 or a variant thereof may provide a space-saving configuration having a relatively small width or thickness. Thus, the interspace between two scintillators 120 in a modular configuration that includes a plurality of side-by-side scintillators 120, as shown in FIGS. 9 and 16, may be kept small. In some embodiments, the interspace or distance between two scintillators 120 may be less than 100 μm. In some embodiments, a detector element includes a plurality of scintillators 120 that may be arranged in a matrix-type fashion. In some embodiments, the detector element may have a very high filling factor. The filling factor represents a ratio of active area (e.g., all "sensitive" front sides 122 of the scintillators 120) to irradiated total area). In some embodiments, the filling factor is greater than 98%.

The detector elements described above are configured to convert the scintillation radiation emitted to a lateral wall 123 of a scintillator 120 into multiplied electrons 204 by a conversion device 160, and further configured to detect the electrons 204. In some embodiments, the radiation emitted to one or both of the first end face 121 and the second end face 122 of the scintillator 120 may be converted into electrons 204 that are detected. In some embodiments, a detector element having high efficiency may be provided.

Figure 17:
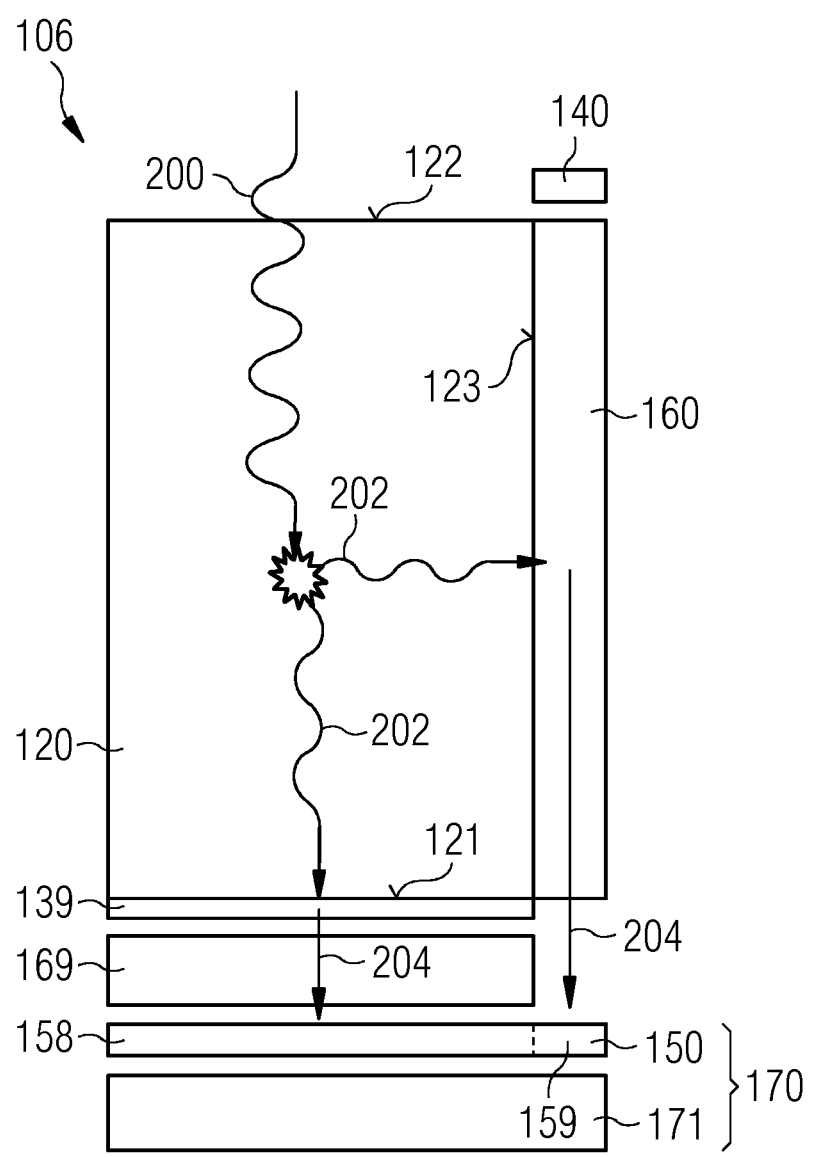
FIG. 17 shows a schematic of an exemplary detector element configured to convert into electrons a portion of the scintillation radiation that emerges from an end face of a scintillator.

FIG. 17 shows a schematic illustration of a detector element 106 that includes a parallelepipedal scintillator 120. The conversion device 160 is provided on the lateral wall 123 of the scintillator 120 analogously to the configurations described above. An electric field may be generated by the electrode 150 and the counterelectrode 140. The electrons 204 converted and multiplied in the conversion device 160 may be accelerated to the electrode 150 and trapped by the electrode 150. As shown in FIG. 17, the electrode 150 is part of a detection device 170 configured for detecting the electrons 204. In some embodiments, the detection device 170 further includes a substrate 171, and the electrode 150 is arranged on the substrate 171.

In some embodiments, a semitransparent photocathode section 139 is provided at the rear side 121 of the scintillator 120. The scintillation photons 202 emerging at the photocathode section 139 may be converted into electrons 204. A microchannel plate 169 is arranged below the photocathode 139. The electrons 204 from the photocathode 139 may be further multiplied in the microchannel plate, subsequently detected by the electrode 150 provided below the microchannel plate 169. As shown in FIG. 17, the electrode 150 may be configured for separately detecting the electrons 204 from the conversion device 160 and the microchannel plate 169. In some embodiments, the electrode 150 includes first electrode region 158 and second electrode region 159 assigned to the microchannel plate 169 and the conversion device 160.

The microchannel plate 169 includes a multiplicity of channels. As a result of impact with the channel walls, the electrons 204 may be multiplied in an avalanche-like manner in the channels of the microchannel plate 169 (e.g., analogously to multiplication in the channels 165 of the conversion device 160). During operation, an electrical voltage (e.g., an acceleration voltage) may be applied between the main surfaces or main sides of the microchannel plate 169 that the channels extend through (e.g., between the front side and rear side). As a result, an electric field is present along the channels. The electric field may be provided using the electrode 150 at the rear side of the microchannel plate 169, and an additional electrode or dynode (not shown) provided at the front side of the microchannel plate 169.

The process described above in reference to FIG. 17 for converting the scintillation radiation emerging at an end face of the scintillator 120 into electrons 204 and multiplying the electrons 204 may also be used with other configurations of detector elements (e.g., detector elements that include a conversion device 160 on each wall of the four lateral walls 123; modular configurations that include a plurality of scintillators 120; etc.). In some embodiments, the scintillation radiation emitted at both the first end face 121 and the second end face 122 of the scintillator 120 may be detected. In some embodiments, the microchannel plate 169 and the detection device 170 shown in FIG. 17 may be provided on both the first end face 121 and the second end face 122.

The representative embodiments described above in reference to the figures are exemplary. Additional embodiments may include further modifications and/or combinations of the features and elements described above. For example, the detectors or detector elements described above in reference to the figures may also include further structures (not shown). Materials that are different from the exemplary materials described above may be used for detector elements or components thereof in accordance with the present teachings. In addition, detector elements or components thereof in accordance with the present teachings may include different dimensions than the exemplary dimensions described above.

Similarly, detector elements or components thereof in accordance with the present teachings may include geometries that deviate from the exemplary geometries depicted in the figures. For example, different geometries may be used for the electrodes used to accelerate and trap electrons, and for electrode arrangements used to cause electron movements in opposite directions. In some embodiments, the conversion device 160 that includes a "two-dimensional channel system" and having channels 165 that run along or are arranged in a plane on a lateral wall of a scintillator 120 may have different shapes than the exemplary shapes described above.

By way of example, the scintillator 120 may have a shape that is different than parallelepipedal. In some embodiments, the scintillator 120 includes two opposing end faces and at least one lateral wall between the end faces. In some embodiments, the end faces are connected via the lateral wall. By way of example, the scintillator 120 may have a cylindrical or circular-cylindrical shape. In some embodiments, the conversion device 160 provided on the lateral wall (e.g., lateral surface) of the scintillator 120 may include channels 165 arranged in a curved plane or other area that reflects the shape of the lateral wall of the scintillator 120. In some embodiments, a grooved channel structure 163 as shown in FIG. 14 may be provided. The lateral wall of the scintillator 123 includes a structured surface, and the channels 165 are provided as indentations or depressions in the lateral wall of the scintillator 120. In this configuration, a curved or circular carrier element 186 may be used for closing the channels 165. The carrier element may be provided with a photocathode 130 on the side facing the channels 165. The electrode 150 and counterelectrode 140 used for accelerating and trapping electrons may be curved or circular. In some embodiments, the channels 165 may be arranged along the entire periphery of the scintillator 120 in order to efficiently convert scintillation radiation emitted to the lateral wall into electrons.

In some embodiments, when a scintillator 120 includes two opposing end faces and a plurality of lateral walls therebetween, the conversion device 160 may be provided on only one of the lateral walls. In other embodiments, when a scintillator 120 includes two opposing end faces and a plurality of lateral walls therebetween, conversion devices 160 may be provided on only a portion of the lateral walls, such that usage of one or more lateral walls is not limited to converting scintillation radiation into multiplied electrons. In some embodiments, when the scintillator 120 includes one or a plurality of lateral walls arranged between two end faces, only a portion as opposed to an entirety of at least one of the lateral walls may be provided with the conversion device 160.

The electrode 150, the fourth L-shaped electrode 151, and the second L-shaped electrode 152 used for trapping multiplied electrons may be provided as separate individual electrodes rather than in a planar configuration having one or a plurality of electrode regions. Each of the separate individual electrodes may be assigned to an individual channel 165 or a plurality of channels 165 of a conversion device 160.

In some embodiments, the electrons of different subsections of an individual conversion device 160 may be separately detected from the electrons of one and the same conversion device 160. In some embodiments, the electrode 150 may be subdivided into different electrode regions. For example, the electrode 150 may be subdivided into different electrode regions for embodiments that include a circular-cylindrical scintillator 120 and a curved or circular (e.g., when viewed in plan view) conversion device 160 arranged on the lateral wall. In some embodiments, an annular trapping electrode 150 that is subdivided into four electrode regions may be provided and used to separately detect electrons generated and multiplied by each section of the four side-by-side sections of the conversion device 160. The lateral interaction location in the circular-cylindrical scintillator 120 may be determined using the above-described subdivided annular trapping electrode 150 or by evaluating the different charge signals obtained via the electrode regions (e.g., summation formation, difference formation, or summation and difference formation).

In some embodiments, the electrons of different subsections of an individual conversion device 160 may be accelerated in different or opposite directions and separately detected. A corresponding electrode arrangement provided on the conversion device 160 may be used. For embodiments that include a circular-cylindrical scintillator 120 and a curved or circular (e.g., when viewed in plan view) conversion device 160 arranged on the lateral wall, corresponding annular cathode-anode structures and detection devices 170 may be provided on both end faces of the scintillator 120. The annular cathode-anode structures may be used to deflect electrons of a first section (e.g., a semi-annular section) of the conversion device 160 in one direction and electrons of a second section (e.g., a semi-annular section) in an opposite direction. The "interaction depth" in the circular-cylindrical scintillator 120 may be determined using the above-described annular cathode structures or by evaluating charge signals (e.g., summation formation, difference formation, or summation and difference formation) obtained using the anodes (e.g., trapping electrodes) arranged on the different end faces.

Other configurations than the representative configurations shown in FIGS. 8 and 14 may be used to provide joint utilization of components arranged in an interspace between two scintillators 120 for two conversion devices 160. By way of example, the carrier element 186 shown in FIG. 8 and the channel walls 166 may be formed from a common substrate and provide a central web of the channel walls 166 extending laterally therefrom. In some embodiments, separate photocathode sections of the channels 165 as opposed to continuous photocathodes 130 may be arranged on both sides at the "central web" 186 (e.g., in a configuration that is to that shown in FIG. 3).

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A radiation detector, comprising:
    a scintillator for generating electromagnetic radiation in response to an action of incident radiation, wherein the scintillator has two mutually opposite end faces and a lateral wall between the end faces;
    a conversion device arranged on the lateral wall of the scintillator and having a plurality of channels, wherein each channel has a photocathode section for generating electrons in response to an action of the electromagnetic radiation generated by the scintillator, which electrons are multipliable by impact processes in the channels, and wherein the plurality of channels of the conversion device run parallel to a longitudinal axis of the scintillator, the longitudinal axis extending between the end faces; and
    a detection device for detecting electrons multiplied in the channels of the conversion device,
    wherein the lateral wall of the scintillator has depressions through which the channels of the conversion device are formed.

2. The radiation detector as claimed in claim 1, wherein the detection device has an electrode for trapping electrons, the electrode being arranged at one end of the channels, and wherein the radiation detector has a counterelectrode for bringing about a movement of electrons to the electrode of the detection device, the counterelectrode being arranged at an opposite end of the channels.

3. The radiation detector as claimed in claim 1, wherein the lateral wall of the scintillator is embodied in a planar fashion, and wherein the conversion device is embodied in the form of a plate-shaped structure on the lateral wall of the scintillator.

4. The radiation detector as claimed in claim 1, wherein the photocathode sections of the channels of the conversion device are embodied in the form of a continuous photocathode.

5. The radiation detector as claimed in claim 4, wherein the continuous photocathode is arranged on a carrier element.

6. The radiation detector as claimed in claim 1, wherein the lateral wall of the scintillator is provided with a layer that is transmissive to the electromagnetic radiation generated by the scintillator.

7. The radiation detector as claimed in claim 1, wherein the channels of the conversion device have a wall coating designed to liberate a plurality of electrons per impact process of an electron.

8. The radiation detector as claimed in claim 1, wherein the plurality of channels of the conversion device are arranged in a plane alongside one another on the lateral wall of the scintillator.

9. A radiation detector comprising:
a scintillator for generating electromagnetic radiation in response to an action of incident radiation, wherein the scintillator has two mutually opposite end faces and a lateral wall between the end faces, and wherein the scintillator is embodied in a parallelepipedal fashion and has four lateral walls between the end faces;
a conversion device having a plurality of channels is arranged on each lateral wall of the four lateral walls of the scintillator, wherein each channel has a photocathode section for generating electrons in response to an action of the electromagnetic radiation generated by the scintillator, which electrons are multipliable by impact processes in the channels, and wherein the plurality of channels of the conversion device run parallel to a longitudinal axis of the scintillator, the longitudinal axis extending between the end faces; and
a detection device for detecting electrons multiplied in the channels of the conversion device.

10. The radiation detector as claimed in claim 1, wherein the detection device is designed for separately detecting electrons generated in channels of different conversion devices or in channels of different subsections of the conversion device.

11. The radiation detector as claimed in claim 1, wherein the radiation detector is additionally designed to convert part of the electromagnetic radiation generated in the scintillator and emerging at an end face into electrons and to detect the electrons.

12. A radiation detector comprising:
two scintillators arranged alongside one another, each scintillator configured for generating electromagnetic radiation in response to an action of incident radiation, wherein each scintillator has two mutually opposite end faces and a lateral wall between the end faces;
conversion devices arranged in an interspace between the scintillators and on opposite lateral walls of the scintillators and assigned to the scintillators and having a plurality of channels, wherein each channel has a photocathode section for generating electrons in response to an action of the electromagnetic radiation generated by the scintillators, which electrons are multipliable by impact processes in the channels, and wherein the plurality of channels of the conversion devices run parallel to a longitudinal axis of the scintillators, the longitudinal axis extending between the end faces; and
a detection device for detecting electrons, the detection device being assigned to the conversion devices.

13. An imaging system comprising:
a radiation detector comprising:
a scintillator for generating electromagnetic radiation in response to an action of incident radiation, wherein the scintillator has two mutually opposite end faces and a lateral wall between the end faces;
a conversion device arranged on the lateral wall of the scintillator and having a plurality of channels, wherein each channel has a photocathode section for generating electrons in response to an action of the electromagnetic radiation generated by the scintillator, which electrons are multipliable by impact processes in the channels, and wherein the plurality of channels of the conversion device run parallel to a longitudinal axis of the scintillator, the longitudinal axis extending between the end faces; and
a detection device for detecting electrons multiplied in the channels of the conversion device,
wherein the radiation detector is designed to bring about a movement of electrons in channels of different conversion devices or in channels of different subsections of the conversion device in different directions.

* * * * *

UNITED STATES PATENT AND TRADEMARK OFFICE
CERTIFICATE OF CORRECTION

| | |
|---|---|
| PATENT NO. | : 9,151,850 B2 |
| APPLICATION NO. | : 14/124712 |
| DATED | : October 6, 2015 |
| INVENTOR(S) | : Harry Hedler et al. |

Page 1 of 1

It is certified that error appears in the above-identified patent and that said Letters Patent is hereby corrected as shown below:

In the claims:
column 27
Claim 9, Line 32, "is" should be removed

Signed and Sealed this
Twenty-second Day of March, 2016

Michelle K. Lee
*Director of the United States Patent and Trademark Office*